United States Patent

Haimi-Cohen et al.

(10) Patent No.: US 12,518,774 B2
(45) Date of Patent: Jan. 6, 2026

(54) IDENTIFYING OPTIMAL ARTICULATORY EVENT-TYPES FOR COMPUTER ANALYSIS OF SPEECH

(71) Applicant: Cordio Medical Ltd., Or Yehuda (IL)

(72) Inventors: Raziel Haimi-Cohen, Springfield, NJ (US); Ilan D. Shallom, Gedera (IL)

(73) Assignee: Cordio Medical Ltd., Or-Yehuda (IL)

( * ) Notice: Subject to any disclaimer, the term of this patent is extended or adjusted under 35 U.S.C. 154(b) by 329 days.

(21) Appl. No.: 18/105,847

(22) Filed: Feb. 5, 2023

(65) Prior Publication Data
US 2024/0265937 A1    Aug. 8, 2024

(51) Int. Cl.
*G10L 25/30* (2013.01)
*G10L 25/51* (2013.01)

(52) U.S. Cl.
CPC .............. *G10L 25/30* (2013.01); *G10L 25/51* (2013.01)

(58) Field of Classification Search
CPC .......... G10L 25/30; G10L 25/51; G10L 25/66
USPC ......................................................... 704/200
See application file for complete search history.

(56) References Cited

U.S. PATENT DOCUMENTS

| | | | |
|---|---|---|---|
| 4,292,471 A | 9/1981 | Kuhn et al. | |
| 4,838,275 A | 6/1989 | Lee | |
| 5,853,005 A | 12/1998 | Scanlon | |
| 5,864,810 A | 1/1999 | Digalakis et al. | |
| 6,006,188 A | 12/1999 | Bogdashevsky et al. | |
| 6,168,568 B1 | 1/2001 | Gavriely | |
| 6,241,683 B1 | 6/2001 | Macklem et al. | |
| 6,289,313 B1 | 9/2001 | Heinonen et al. | |
| 6,389,393 B1 | 5/2002 | Gong | |
| 6,396,416 B1 | 5/2002 | Kuusela et al. | |
| 6,527,729 B1 | 3/2003 | Turcott | |
| 6,600,949 B1 | 7/2003 | Turcott | |
| 7,092,874 B2 | 8/2006 | Clavbo | |
| 7,225,013 B2 | 5/2007 | Geva et al. | |

(Continued)

FOREIGN PATENT DOCUMENTS

| CN | 102125427 A | 7/2011 |
|---|---|---|
| CN | 102423262 A | 4/2012 |

(Continued)

OTHER PUBLICATIONS

R. Voleti, J. M. Liss and V. Berisha, "A Review of Automated Speech and Language Features for Assessment of Cognitive and Thought Disorders," in IEEE Journal of Selected Topics in Signal Processing, vol. 14, No. 2, pp. 282-298, Feb. 2020, doi: 10.1109/JSTSP.2019.2952087. keywords: {Feature extraction (Year: 2020).*

(Continued)

*Primary Examiner* — Bharatkumar S Shah
(74) *Attorney, Agent, or Firm* — Meitar Patents Ltd.; Daniel Kligler

(57) ABSTRACT

A method includes, based on one or more representations of an articulatory event-type, computing, by a processor, a score quantifying an estimated degree to which an instance of the articulatory event-type indicates a state, with respect to a disease, in which the instance was produced. The method further includes storing or communicating the score for subsequent use in evaluating the state of a subject based on a test utterance produced by the subject. Other embodiments are also described.

43 Claims, 9 Drawing Sheets

(56) References Cited

U.S. PATENT DOCUMENTS

| | | |
|---|---|---|
| 7,226,422 B2 | 6/2007 | Hatlestsad et al. |
| 7,267,652 B2 | 9/2007 | Coyle et al. |
| 7,283,962 B2 | 10/2007 | Meyerhoif et al. |
| 7,363,226 B2 | 4/2008 | Shiomi et al. |
| 7,398,213 B1 | 7/2008 | Levanon et al. |
| 7,457,753 B2 | 11/2008 | Moran et al. |
| 7,529,670 B1 | 5/2009 | Michaelis |
| 7,762,264 B1 | 7/2010 | Raming et al. |
| 8,478,596 B2 | 7/2013 | Schultz |
| 8,591,430 B2 | 11/2013 | Amurthur et al. |
| 8,684,900 B2 | 4/2014 | Tran |
| 8,689,606 B2 | 4/2014 | Schellekens et al. |
| 8,784,311 B2 | 7/2014 | Shrivastav et al. |
| 8,903,725 B2 | 12/2014 | Pilz |
| 9,070,357 B1 | 6/2015 | Kennedy et al. |
| 9,138,167 B1 | 9/2015 | Leydon |
| 9,153,231 B1 | 10/2015 | Salvador et al. |
| 9,445,763 B2 | 9/2016 | Davis et al. |
| 9,492,096 B2 | 11/2016 | Brockway et al. |
| 9,579,056 B2 | 2/2017 | Rosenbek et al. |
| 9,685,174 B2 | 6/2017 | Karam et al. |
| 9,922,641 B1 | 3/2018 | Chun |
| 10,311,980 B2 | 6/2019 | Kim et al. |
| 10,796,205 B2 | 10/2020 | Shi et al. |
| 10,796,805 B2 | 10/2020 | Lotan et al. |
| 10,847,177 B2 | 11/2020 | Shallom |
| 10,896,765 B2 | 1/2021 | Kim et al. |
| 10,991,384 B2* | 4/2021 | Eyben .............. G10L 25/63 |
| 11,011,188 B2 | 5/2021 | Shallom |
| 11,024,327 B2 | 6/2021 | Shallom |
| 11,417,342 B2 | 8/2022 | Shallom |
| 11,484,211 B2 | 11/2022 | Shallom |
| 11,538,490 B2 | 12/2022 | Shallom |
| 11,610,600 B2 | 3/2023 | Shallom |
| 12,046,238 B2 | 7/2024 | Khaleghi |
| 2002/0059029 A1 | 5/2002 | Todder et al. |
| 2003/0115054 A1 | 6/2003 | Iso-Sipila |
| 2003/0220790 A1 | 11/2003 | Kepuska |
| 2004/0097822 A1 | 5/2004 | Muz et al. |
| 2005/0038635 A1 | 2/2005 | Klefenz et al. |
| 2005/0060153 A1 | 3/2005 | Gable et al. |
| 2006/0058697 A1 | 3/2006 | Mochizuki et al. |
| 2006/0116878 A1 | 6/2006 | Nagamine |
| 2006/0167385 A1 | 7/2006 | Guion |
| 2006/0293609 A1 | 12/2006 | Stahmann et al. |
| 2007/0005357 A1 | 1/2007 | Moran et al. |
| 2007/0100623 A1 | 5/2007 | Hentschel et al. |
| 2007/0225975 A1 | 9/2007 | Imoto |
| 2007/0288183 A1 | 12/2007 | Bulkes et al. |
| 2008/0013747 A1 | 1/2008 | Tran |
| 2008/0275349 A1 | 11/2008 | Halperin et al. |
| 2009/0036777 A1 | 2/2009 | Zhang et al. |
| 2009/0043586 A1 | 2/2009 | MacAuslan |
| 2009/0099848 A1 | 4/2009 | Lerner et al. |
| 2009/0227888 A1 | 9/2009 | Salmi et al. |
| 2009/0326937 A1 | 12/2009 | Chitsaz et al. |
| 2010/0201807 A1 | 8/2010 | Mcpherson |
| 2011/0021940 A1 | 1/2011 | Chu et al. |
| 2011/0092779 A1 | 4/2011 | Chang et al. |
| 2011/0125044 A1 | 5/2011 | Rhee |
| 2011/0184250 A1 | 7/2011 | Schmidt et al. |
| 2012/0041279 A1 | 2/2012 | Freeman et al. |
| 2012/0116186 A1 | 5/2012 | Shrivastav et al. |
| 2012/0220899 A1 | 8/2012 | Oh et al. |
| 2012/0265024 A1 | 10/2012 | Shrivastav et al. |
| 2012/0283598 A1 | 11/2012 | Horii et al. |
| 2013/0018274 A1 | 1/2013 | O'Neill |
| 2013/0158434 A1 | 6/2013 | Shen et al. |
| 2013/0166279 A1 | 6/2013 | Dines et al. |
| 2013/0218582 A1 | 8/2013 | Lalonde |
| 2014/0005564 A1 | 1/2014 | Vanovic et al. |
| 2014/0073993 A1 | 3/2014 | Poellabauer et al. |
| 2014/0153794 A1 | 6/2014 | Varaklis et al. |
| 2014/0249424 A1 | 9/2014 | Fan et al. |
| 2014/0294188 A1 | 10/2014 | Rini et al. |
| 2014/0302472 A1 | 10/2014 | Fletcher |
| 2014/0314212 A1 | 10/2014 | Bentley et al. |
| 2015/0073306 A1 | 3/2015 | Abeyratne et al. |
| 2015/0126888 A1 | 5/2015 | Patel et al. |
| 2015/0127350 A1 | 5/2015 | Agiomyrgiannakis |
| 2015/0216448 A1 | 8/2015 | Lotan et al. |
| 2015/0265205 A1 | 9/2015 | Rosenbek et al. |
| 2016/0015289 A1 | 1/2016 | Simon et al. |
| 2016/0045161 A1 | 2/2016 | Alshaer et al. |
| 2016/0081611 A1 | 3/2016 | Hampton et al. |
| 2016/0095545 A1 | 4/2016 | Levanon |
| 2016/0113618 A1 | 4/2016 | Su et al. |
| 2016/0249842 A1 | 9/2016 | Ohana Lubelchick |
| 2016/0302003 A1 | 10/2016 | Rahman et al. |
| 2017/0069312 A1 | 3/2017 | Sundararajan et al. |
| 2017/0084295 A1 | 3/2017 | Tsiartas et al. |
| 2017/0262606 A1* | 9/2017 | Abdullah ............ G16Z 99/00 |
| 2017/0280239 A1 | 9/2017 | Sekiya et al. |
| 2017/0325779 A1 | 11/2017 | Spina et al. |
| 2017/0354363 A1 | 12/2017 | Quatieri et al. |
| 2018/0004913 A1 | 1/2018 | Ghasemzadeh et al. |
| 2018/0108440 A1 | 4/2018 | Stevens et al. |
| 2018/0125444 A1 | 5/2018 | Kahlman et al. |
| 2018/0214061 A1 | 8/2018 | Knoth et al. |
| 2018/0296092 A1 | 10/2018 | Hassan et al. |
| 2019/0130910 A1 | 5/2019 | Kariya et al. |
| 2019/0221317 A1 | 7/2019 | Kempanna et al. |
| 2019/0311815 A1 | 10/2019 | Kim et al. |
| 2019/0385711 A1 | 12/2019 | Shriberg et al. |
| 2020/0077940 A1 | 3/2020 | Srivastava et al. |
| 2020/0098384 A1* | 3/2020 | Nematihosseinabadi .................... G10L 15/22 |
| 2020/0152226 A1 | 5/2020 | Anushiravani et al. |
| 2020/0168230 A1 | 5/2020 | Roh et al. |
| 2021/0065676 A1* | 3/2021 | Abrami ............ G10L 13/047 |
| 2021/0110894 A1 | 4/2021 | Shriberg et al. |
| 2021/0193169 A1 | 6/2021 | Faizakof et al. |
| 2021/0256992 A1 | 8/2021 | Shallom |
| 2022/0130415 A1 | 4/2022 | Garrison et al. |
| 2022/0165295 A1 | 5/2022 | Shallom |
| 2022/0328064 A1 | 10/2022 | Shriberg et al. |
| 2022/0409063 A1 | 12/2022 | Shallom |
| 2022/0415308 A1 | 12/2022 | Berisha et al. |
| 2023/0072242 A1 | 3/2023 | Kim et al. |
| 2023/0080870 A1 | 3/2023 | Shallom |
| 2023/0190177 A1* | 6/2023 | Shor ............... A61B 5/4839 600/529 |
| 2023/0352013 A1 | 11/2023 | Khaleghi |

FOREIGN PATENT DOCUMENTS

| | | |
|---|---|---|
| CN | 202261466 U | 5/2012 |
| CN | 102497472 A | 6/2012 |
| CN | 107622797 A | 1/2018 |
| DE | 102015218948 A1 | 3/2017 |
| EP | 1091689 A1 | 4/2001 |
| EP | 1855594 A1 | 11/2007 |
| EP | 2124223 A1 | 11/2009 |
| EP | 2438863 A1 | 4/2012 |
| EP | 3365057 A1 | 8/2018 |
| FR | 2672793 A1 | 8/1992 |
| GB | 1219618 A | 1/1971 |
| GB | 2493458 A | 2/2013 |
| JP | 04082538 A | 3/1992 |
| JP | 09173320 A | 7/1997 |
| JP | 2003044078 A | 2/2003 |
| JP | 2004302786 A | 10/2004 |
| JP | 2006230548 A | 9/2006 |
| JP | 2016006504 A | 1/2016 |
| JP | 2017191166 A | 10/2017 |
| JP | 6263308 B1 | 1/2018 |
| SE | 508439 C2 | 10/1998 |
| WO | 03068062 A1 | 8/2003 |
| WO | 2005074799 A1 | 8/2005 |
| WO | 2006033044 A3 | 3/2006 |
| WO | 2006079062 A1 | 7/2006 |
| WO | 2010004025 A1 | 1/2010 |
| WO | 2010015865 A1 | 2/2010 |
| WO | 2010123483 A2 | 10/2010 |

(56) References Cited

FOREIGN PATENT DOCUMENTS

| WO | 2012038903 A2 | 3/2012 |
|---|---|---|
| WO | 2012104743 A2 | 8/2012 |
| WO | 2013043847 A1 | 3/2013 |
| WO | 2013170131 A1 | 11/2013 |
| WO | 2014037843 A1 | 3/2014 |
| WO | 2014045257 A1 | 3/2014 |
| WO | 2014188408 A1 | 11/2014 |
| WO | 2016028495 A1 | 2/2016 |
| WO | 2017060828 A1 | 4/2017 |
| WO | 2017068582 A1 | 7/2017 |
| WO | 2017147221 A1 | 8/2017 |
| WO | 2018021920 A1 | 2/2018 |
| WO | 2019089830 A1 | 5/2019 |
| WO | 2019210261 A1 | 10/2019 |

OTHER PUBLICATIONS

Hickey., "App lets you monitor lung health using only a smartphone", pp. 1-5, Sep. 18, 2012.
Gandler et al., "Mobile FEV: Evaluation of iPhone Spirometer", pp. 1-1, Feb. 14, 2013.
Abushakra et al., "Lung capacity estimation through acoustic signal of breath", 13th IEEE International Conference on BioInformatics and BioEngineering, pp. 386-391, Nov. 11-Nov. 13, 2012.
G.P. Imports, Inc., "Spirometer Pro", pp. 1-3, Jan. 8, 2010.
Murton et al., "Acoustic speech analysis of patients with decompensated heart failure: A pilot study", The Journal of the Acoustical Society of America, vol. 142, Issue 4, pp. 1-28, Oct. 24, 2017.
Gillespie et al., "The Effects of Hyper- and Hypocapnia on Phonatory Laryngeal Airway Resistance in Women", Research Article, Journal of Speech, Language, and 638 Hearing Research, vol. 58, pp. 638-652, Jun. 2015.
Wang et al., "Accuracy of perceptual and acoustic methods for the detection of inspiratory loci in spontaneous speech", Behavior Research Methods, vol. 44, Issue 4, pp. 1121-1128, Dec. 2012.
Larson et al., "SpiroSmart: using a microphone to measure lung function on a mobile phone", Proceedings of the 2012 ACM Conference on Ubiquitous Computing (UbiComp '12), pp. 280-289, Sep. 5-8, 2012.
Abushakra et al., "An Automated Approach Towards Estimating Lung Capacity from Respiration Sounds", IEEE Healthcare Innovations Conference (HIC'12), pp. 1-5, Jan. 2012.
Williammson et al., "Vocal and Facial Biomarkers of Depression Based on Motor Incoordination and Timing", 4th International Audio/Visual Emotion Challenge and Workshop: Depression Challenge, Orlando, Florida, USA , pp. 1-8, Nov. 7, 2014.
Ciccarelli et al., "Neurophysiological Vocal Source Modeling for Biomarkers of Disease", Interspeech 2016: Understanding Speech Processing in Humans and Machines, Technical Program, San Francisco, USA, pp. 1-7, Sep. 8-12, 2016.
Helfer et al., "Classification of depression state based on articulatory precision", Proceedings of the 14th Annual Conference of the International Speech Communication Association (Interspeech), pp. 2172-2176, year 2013.
Horwitz., "Vocal Modulation Features in the Prediction of Major Depressive Disorder Severity", Master Thesis, Massachusetts Institute of Technology, pp. 1-115, Sep. 2014.
Hillel., "Using phonation time to estimate vital capacity in amyotrophic lateral sclerosis", Arch Phys Med Rehabil, vol. 70, pp. 618-620, Aug. 1989.
Yanagihara., "Phonation and Respiration", Folia Phoniat, vol. 18, pp. 323-340, year 1966.
Dewar et al., "Chronic obstructive pulmonary disease: diagnostic considerations.", American Academy of Family Physicians, vol. 73, pp. 669-676, Feb. 2006.
Solomon et al., "Respiratory and laryngeal contributions to maximum phonation duration", Journal of voice, vol. 14, No. 3, pp. 331-340, Sep. 2000.
Dogan et al., "Subjective and objective evaluation of voice quality in patients with asthma", Journal of voice, vol. 21, No. 2, pp. 224-230, Mar. 2007.
Orenstein et al., "Measuring ease of breathing in young patients with cystic fibrosis", Pediatric Pulmonology, vol. 34, No. 6, pp. 473-477, Aug. 8, 2002.
Lee et al., "Speech Segment Durations Produced by Healthy and Asthmatic Subjects", Journal of Speech and Hearing Disorders, vol. 653, pp. 186-193, May 31, 1988.
Rabiner, L., "A tutorial on hidden Markov models and selected applications in speech recognition," Proceedings of the IEEE, vol. 77, issue 2, pp. 257-286, Feb. 1989.
Rabiner et al., "Fundamentals of Speech Recognition", Prentice Hall, pp. 1-18 (related section 6.4.3.), year 1993.
Sakoe et al., "Dynamic Programming Algorithm Optimization for Spoken Word Recognition", IEEE Transactions on Acoustics, Speech and Signal Processing, vol. ASSP-26, No. 1, pp. 43-49, Feb. 1978.
Lee et al., "Consistency of acoustic and aerodynamic measures of voice production over 28 days under various testing conditions", Journal of Voice, vol. 13, issue 4, pp. 477-483, Dec. 1, 1999.
Walia et al., "Level of Asthma: A Numerical Approach based on Voice Profiling", IJEDR(International Journal of Engineering Development and Research), vol. 4, Issue 4, pp. 717-722, year 2016.
Mulligan et al., "Detecting regional lung properties using audio transfer functions of the respiratory system", 31st Annual International Conference of the IEEE EMBS, pp. 5697-5700, Sep. 2-6, 2009.
Christina et al., "HMM-based speech recognition system for the dysarthric speech evaluation of articulatory subsystem", International Conference on Recent Trends in Information Technology, pp. 54-59, Apr. 1, 2012.
Wang et al., "Vocal folds disorder detection using pattern recognition methods", 29th Annual International Conference of the IEEE Engineering in Medicine and Biology Society, pp. 3253-3256, Aug. 22-26, 2007.
Masada et al., "Feature Extraction by ICA and Clustering for Lung Sound Classification", IPSJ Symposium Series, vol. 2007, pp. 1-9, year 2007.
De La Torre et al., "Discriminative feature weighting for HMM-based continuous speech recognizers", Speech Communication, vol. 38, pp. 267-286, year 2001.
Mswanathan et al., "Complexity Measures of Voice Recordings as a Discriminative Tool for Parkinson's Disease", MDPI Journal Biosensors 2020, vol. 10, No. 1, pp. 1-16, Dec. 20, 2019.
Williamson et al., "Segment-dependent dynamics in predicting Parkinson's disease", ISCA Conference Interspeech 2015, pp. 518-522, Dresden, Germany, Sep. 6-10, 2015.
Valente et al., "Maximum Entropy Discrimination (MED) Feature subset Selection for Speech Recognition", IEEE Workshop on Automatic Speech Recognition and Understanding (ASRU), ResearchGate publication, pp. 327-332, Nov. 30-Dec. 4, 2003.
Ramirez et al., "Voice activity detection. Fundamentals and speech recognition system robustness", Robust Speech Recognition and Understanding, I-Tech, Vienna, Austria, pp. 1-24, Jun. 2007.
Bachu et al., "Separation of Voiced and Unvoiced Speech Signals using Energy and Zero Crossing Rate", ASEE Regional Conference, pp. 1-7, year 2008.
International Application # PCT/IB2024/050483 Search Report dated May 7, 2024.
EP Application # 21832054.7 Search Report dated Mar. 11, 2024.
Eden et al., "Measuring phonological distance between languages", Doctor Thesis, UCL Department of Linguistics, pp. 1-254, year 2018.
Falkhausen et al., "Calculation of Distance Measures Between Hidden Markov Models", 4th European Conference on Speech Communication and Technology, pp. 1487-1490, Sep. 18-21, 1995.
Kempton et al., "Cross-language phone recognition when the target language phoneme inventory is not known", 12th Annual Conference of the International Speech Communication Association, pp. 3165-3168, Aug. 27-31, 2011.
Kienappel et al., "Cross-Language Transfer of Multilingual Phoneme Models", ASR2000—Automatic Speech Recognition Challenges for the New Millennium, pp. 1-5, Sep. 18-20, 2000.

(56) References Cited

OTHER PUBLICATIONS

Gupta et al., "Characterizing Exhaled Airflow from Breathing and Talking," Indoor Air, vol. 20, pp. 31-39, year 2010.
Mirza et al., "Analytical Modeling and Simulation of a CMOS-MEMS Cantilever Based CO2 Sensor for Medical Applications," Proceedings IEEE Regional Symposium on Micro and Nanoelectronics, pp. 70-73, Sep. 27, 2013.
Bhagya et al., "Speed of Sound-Based Capnographic Sensor with Second-Generation CNN for Automated Classification of Cardiorespiratory Abnormalities," IEEE Sensors Journal, vol. 19, issue 19, pp. 8887-8894, Oct. 1, 2019.
Kohler, "Multi-Lingual Phoneme Recognition Exploiting Acoustic-Phonetic Similarities of Sounds", 4th International Conference on Spoken Language Processing (ICSLP 96), pp. 1-4, Oct. 3-6, 1996.
Pitts et al., "Using Voluntary Cough to Detect Penetration and Aspiration During Oropharyngeal Swallowing in Patients With Parkinson Disease", Chest, vol. 138, issue 6, pp. 1426-1431, Dec. 2010.
Sooful et al., "An acoustic distance measure for automatic cross-language phoneme mapping", PRASA proceedings, pp. 1-4, year 2001.
Sooful et al., "Comparison of acoustic distance measures for automatic cross-language phoneme mapping", 7th International Conference on Spoken Language Processing, pp. 1-4, Sep. 16-20, 2002.
Sterling et al., "Automated Cough Assessment on a Mobile Platform", Journal of Medical Engineering, pp. 1-10, year 2014.
Vaswani et al., "Attention is all you need", 31st Conference on Neural Information Processing systems, pp. 1-11, year 2017.
Zeng et al., "A new distance measure for hidden Markov models", Expert Systems with Applications, vol. 37, pp. 1550-1555, year 2010.
Rabiner et al., "Fundamentals of Speech Recognition", Prentice Hall, chapters 7-8, pp. 390-481, year 1993.
Wikipedia, "Breathing," pp. 1-13, last edited Oct. 17, 2021, as downloaded from https://en.wikipedia.org/wiki/Breathing.
"Sound Speed in Gases," Sound and Hearing, HyperPhysics, Department of Physics and Astronomy, Georgia State University, USA, pp. 1-3, year 2017, as downloaded from http://hyperphysics.phy-astr.gsu.edu/hbase/Sound/souspe3.html.
"Echo Devices," Amazon.com, Inc, Interest-Based Ads, pp. 1-6, year 2021, as downloaded from https://www.amazon.com/echo-devices/s?k=echo+devices.
"The Best Google Home Speakers in 2021," Tom's Guide, Future US Inc., pp. 1-21, year 2021, as downloaded from https://www.tomsguide.com/best-picks/best-google-home-speakers.
West et al., "Measurements of Pulmonary Gas Exchange Efficiency using Expired Gas and Oximetry: Results in Normal Subjects," American Journal of Physiology—Lung Cellular and Molecular Physiology, vol. 314, No. 4, pp. L686-L689, year 2018.
West et al., "A New Method for Noninvasive Measurement of Pulmonary Gas Exchange Using Expired Gas," Respiratory Physiology & Neurobiology, vol. 247, pp. 112-115, year 2018.
Huang et al., "An Accurate Air Temperature Measurement System Based on an Envelope Pulsed Ultrasonic Time-of-Flight Technique," Review of Scientific Instruments, vol. 78, pp. 115102-1-115102-9, year 2007.
Jedrusyna, "An Ultrasonic Air Temperature Meter", Book "Recent Advances in Mechatronics", Springer, Berlin, Heidelberg, pp. 85-89, year 2010.
Cramer, "The Variation of the Specific Heat Ratio and the Speed of Sound in Air with Temperature, Pressure, Humidity, and CO2 Concentration," Journal of the Acoustical Society of America, vol. 93, No. 5, pp. 2510-2516, May 1993.
Rao et al., "Acoustic Methods for Pulmonary Diagnosis," HHS Public Access, Author manuscript, pp. 1-39, year 2020 (final version published in IEEE Reviews in Biomedical Engineering, vol. 12, pp. 221-239, year 2019).
Cohen, "Signal processing methods for upper airway and pulmonary dysfunction diagnosis," IEEE Engineering in Medicine and Biology Magazine, vol. 9, No. 1, pp. 72-75, Mar. 1, 1990.
Ney, "The Use of a One-Stage Dynamic Programming Algorithm for Connected Word Recognition," IEEE Transactions on Acoustics, Speech, and Signal Processing, vol. ASSP-32, No. 2, pp. 263-271, Apr. 1984.
Haimi-Cohen et al., U.S. Appl. No. 18/105,848, filed Feb. 5, 2023.
Sakran et al., "A Review: Automatic Speech Segmentation", International Journal of Computer Science and Mobile Computing (IJCSMC), vol. 6, issue 4, pp. 308-315, Apr. 2017.
Nicora et al., "Evaluating pointwise reliability of machine learning prediction", Journal of Biomedical Informatics, vol. 127, pp. 1-15, Mar. 2022.
JP Application # 2021-517971 Office Action dated May 16, 2023.
EP Application # 21209891.7 Office Action dated May 19, 2023.
Indian Application # 202247066856 Office Action dated Mar. 29, 2023.
EP Application # 19201720.0 Office Action dated Mar. 30, 2023.
EP Application # 20158058.6 Summons to Oral Proceedings dated Apr. 19, 2023.
Katsir et al., U.S. Appl. No. 18/319,518, filed May 18, 2023.
Haimi-Cohen et al., U.S. Appl. No. 18/328,738, filed Jun. 4, 2023.
Haimi-Cohen et al., U.S. Appl. No. 18/328,739, filed Jun. 4, 2023.
International Application # PCT/IB2024/054360 Search Report dated Jun. 28, 2024.
JP Application # 2022576351 Office Action dated Jul. 2, 2024.
U.S. Appl. No. 17/902,836 Office Action, filed Jul. 8, 2024.
International Application # PCT/IB2024/054359 Search Report dated Jul. 9, 2024.
AU Application # 2021384028 Office Action Aug. 15, 2024.
EP Application # 24181539.8 Search Report dated Sep. 4, 2024.
CN Application # 2020800180012 Office Action dated Jan. 30, 2024.
IN Application # 202347030550 Office Action dated Dec. 13, 2023.
CN Application # 2019800670875 Office Action dated Dec. 20, 2023.
JP Application # 2021549583 Office Action dated Dec. 25, 2023.
JP Application # 2021551893 Office Action dated Dec. 25, 2023.
CN Application # 202080017839X Office Action dated Jan. 27, 2024.
JP Application # 2022548568 Office Action dated Oct. 29, 2024.
U.S. Appl. No. 17/531,828 Office Action dated Jan. 15, 2025.
U.S. Appl. No. 18/105,848 Office Action dated Jan. 21, 2025.
CN Application # 202180045274.0 Office Action dated Feb. 28, 2025.
U.S. Appl. No. 18/328,738 Office Action dated Apr. 11, 2025.
U.S. Appl. No. 18/328,739 Office Action dated Apr. 25, 2025.
CN Application # 202180017631.2 Office Action dated Mar. 31, 2025.
Canadian Examination report, application # 3,114,864, dated Oct. 16, 2025.
Korean Office Action, application # 10-2021-7032027, dated Oct. 24, 2025.
Korean Office Action, application # 10-2021-7032025, dated Sep. 26, 2025.

* cited by examiner

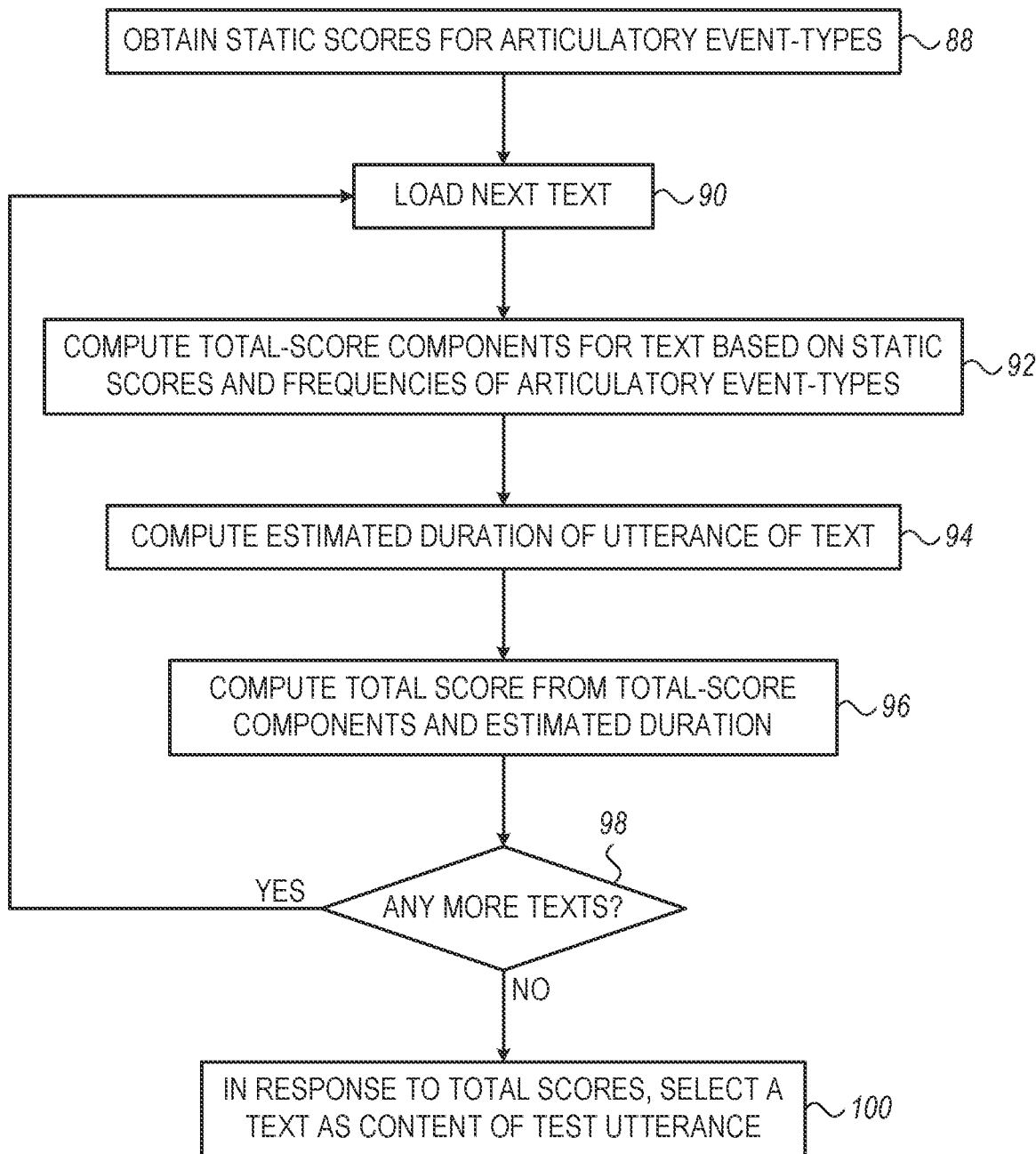

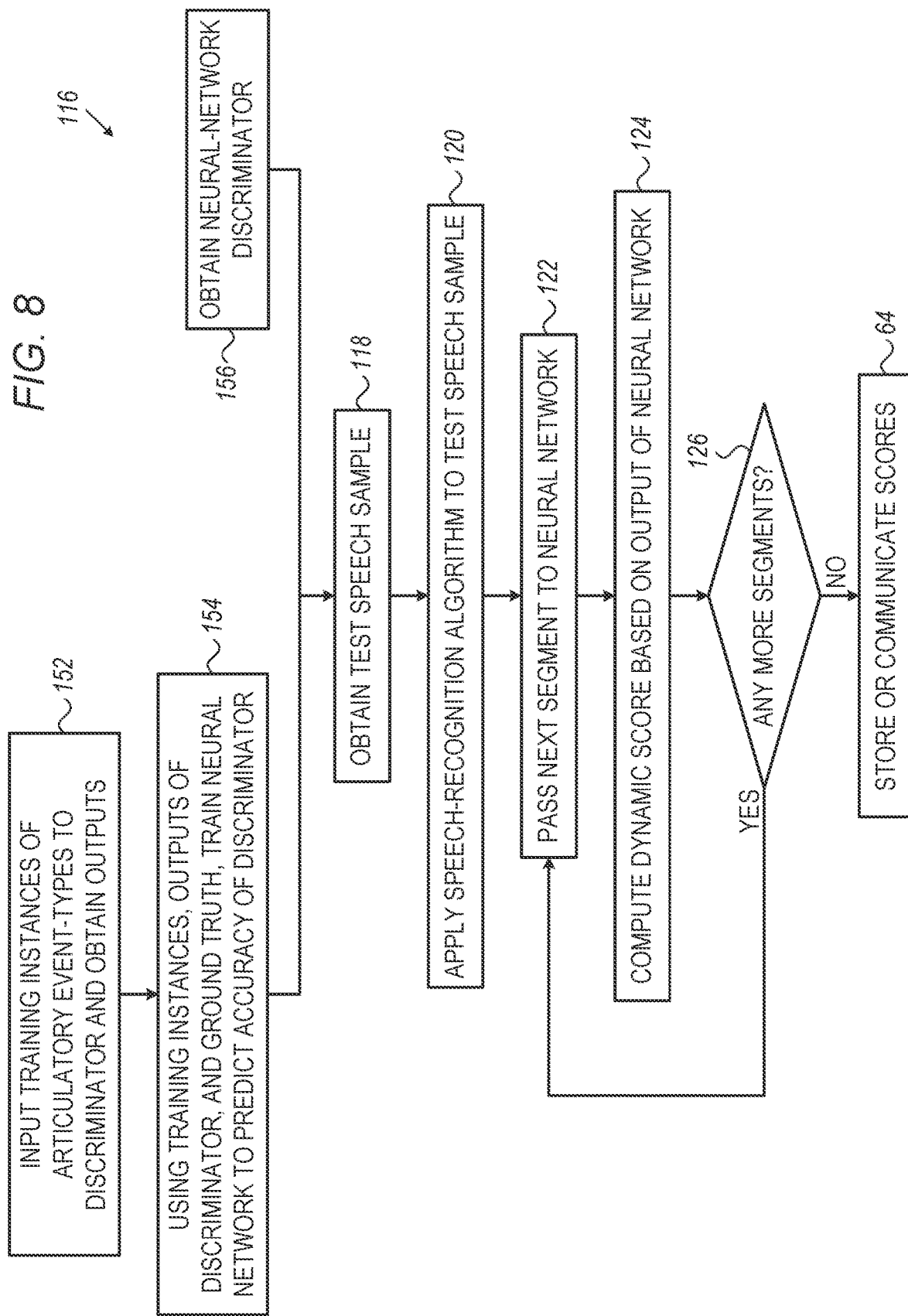

IDENTIFYING OPTIMAL ARTICULATORY EVENT-TYPES FOR COMPUTER ANALYSIS OF SPEECH

CROSS-REFERENCE TO RELATED APPLICATIONS

The present application is related to another application entitled "Using optimal articulatory event-types for computer analysis of speech" Ser. No. 18/105,848, filed on even date herewith.

FIELD OF THE INVENTION

The present invention is related to computer analysis of speech.

BACKGROUND OF THE INVENTION

US Patent Application Publication 2019/0311815 to Kim discloses apparatuses, systems, methods, and computer program products for medical assessment based on voice. A query module is configured to audibly question a user from a speaker of a mobile computing device with one or more open ended questions. A response module is configured to receive a conversational verbal response of a user from a microphone of a mobile computing device in response to one or more open ended questions. A detection module is configured to provide a machine learning assessment for a user of a medical condition based on a machine learning analysis of a received conversational verbal response of the user.

de la Torre, Angel, et al., "Discriminative feature weighting for HMM-based continuous speech recognizers," Speech Communication 38.3-4 (2002): 267-286 describes the application of Discriminative Feature Weighting (DFW) formalism to Continuous Speech Recognizers (CSR) based on Hidden Markov Models (HMMs). Two different types of HMM-based speech recognizers are considered: recognizers based on Discrete-HMMs (DHMMs), and recognizers based on Semi-Continuous-HMMs (SCHMMs).

Valente, Fabio, and Christian Wellekens, "Maximum entropy discrimination (MED) feature subset selection for speech recognition," 2003 IEEE Workshop on Automatic Speech Recognition and Understanding (IEEE Cat. No. 03EX721), IEEE, 2003 investigates the application of maximum entropy discrimination (MED) feature selection in speech recognition problems. The paper compares the MED algorithm with a classical wrapper feature selection algorithm and proposes a hybrid wrapper/MED algorithm.

Williamson, James R., et al. "Segment-dependent dynamics in predicting Parkinson's disease," Sixteenth annual conference of the international speech communication association, 2015 introduces a set of acoustic speech biomarkers, and fuses them with conventional features for predicting clinical assessment of Parkinson's disease. The paper introduces acoustic biomarkers reflecting the segment dependence of changes in speech production components, motivated by disturbances in underlying neural motor, articulatory, and prosodic brain centers of speech. Such changes occur at phonetic and larger time scales, including multi-scale perturbations in formant frequency and pitch trajectories, in phoneme durations and their frequency of occurrence, and in temporal waveform structure. The paper also introduces articulatory features based on a neural computational model of speech production, the Directions into Velocities of Articulators (DIVA) model.

Viswanathan, Rekha, et al., "Complexity measures of voice recordings as a discriminative tool for Parkinson's disease," Biosensors 10.1 (2020): 1 investigates the differences in the voices of Parkinson's disease (PD) and age-matched control (CO) subjects when uttering three phonemes using two complexity measures: fractal dimension (FD) and normalised mutual information (NMI).

SUMMARY OF THE INVENTION

There is provided, in accordance with some embodiments of the present invention, a system including a memory, which is configured to store program instructions, and a processor. The processor is configured to load the program instructions from the memory, and by executing the program instructions, to compute, based on one or more representations of an articulatory event-type, a score quantifying an estimated degree to which an instance of the articulatory event-type indicates a state, with respect to a disease, in which the instance was produced, and to store or communicate the score for subsequent use in evaluating the state of a subject based on a test utterance produced by the subject.

There is further provided, in accordance with some embodiments of the present invention, a method including, based on one or more representations of an articulatory event-type, computing, by a processor, a score quantifying an estimated degree to which an instance of the articulatory event-type indicates a state, with respect to a disease, in which the instance was produced. The method further includes storing or communicating the score for subsequent use in evaluating the state of a subject based on a test utterance produced by the subject.

In some embodiments, the articulatory event-type includes one or more phonemes.

In some embodiments, the score quantifies the estimated degree to which any instance of the articulatory event-type indicates the state.

In some embodiments, the representations are respective segments of one or more speech samples.

In some embodiments,
the speech samples are first-state speech samples produced while in a first state with respect to the disease, and the segments are first-state segments, and
computing the score includes computing the score based on:
one or more same-state distances quantifying a same-state similarity of the first-state segments to each other, and
one or more cross-state distances quantifying a cross-state similarity of the first-state segments to one or more second-state segments of at least one second-state speech sample produced while in a second state with respect to the disease.

In some embodiments, computing the score based on the same-state distances and cross-state distances includes:
computing respective counts for multiple segments, each of which is one of the first-state segments or one of the second-state segments, by, for each of the segments:
identifying, from a set S of distances including those of the same-state distances associated with the segment and those of the cross-state distances associated with the segment, a subset S', which includes, for a positive integer q, q smallest ones of the distances, and computing the count for the segment as (i) a number v of the distances in S' that are same-state distances, or (ii) q−v; and computing the score based on the counts.

In some embodiments, computing the score based on the same-state distances and cross-state distances includes computing the score by comparing a same-state statistic of the same-state distances to a cross-state statistic of the cross-state distances.

In some embodiments, the speech samples are first-state speech samples produced while in a first state with respect to the disease, and the segments are first-state segments, and computing the score includes computing the score based on (i) multiple same-state distances between respective ones of the first-state segments and a first-state model representing the articulatory event-type as produced while in the first state, and (ii) multiple cross-state distances between respective ones of the first-state segments and a second-state model representing the articulatory event-type as produced while in the second state.

In some embodiments, computing the score includes:

obtaining respective outputs for the segments from a discriminator, each of the outputs estimating, for a different respective one of the segments, the state in which the segment was produced; and computing the score based on a measure of accuracy of the outputs.

In some embodiments, computing the score includes computing the score based on respective neuronal outputs produced by a neural-network discriminator in response to evaluating, based on each of the segments, the state in which the segment was produced.

In some embodiments, computing the score based on the neuronal outputs includes:

computing respective score-components for the segments, each of the score-components having (i) a magnitude that is an increasing function of the neuronal output produced by the neural-network discriminator in response to the segment to which the score-component belongs, and (ii) a sign that depends on whether the evaluation, based on the segment to which the score-component belongs, is correct; and computing the score based on the score-components.

In some embodiments, the representations include a first-state model representing the articulatory event-type as produced while in a first state with respect to the disease.

In some embodiments, computing the score includes computing the score based on a distance between the first-state model and a second-state model representing the articulatory event-type as produced while in a second state with respect to the disease.

In some embodiments, the first-state model and second-state model represent the articulatory event-type as produced by one or more other subjects, the distance is a first distance, and computing the score includes computing the score based on a second distance between:

a subject-specific model representing the articulatory event-type as produced by the subject while in the first state, and the first-state model or the second-state model.

In some embodiments, the first-state model represents the articulatory event-type as produced by the subject, and computing the score includes computing the score based on:

a same-state distance quantifying a same-state similarity of the first-state model to another first-state model representing the articulatory event-type as produced by one or more other subjects while in the first state, and a cross-state distance quantifying a cross-state similarity of the first-state model to a second-state model representing the articulatory event-type as produced by one or more other subjects while in the second state.

In some embodiments, the articulatory event-type is a target-language articulatory event-type in a target language, the score is a target-language score, and computing the target-language score includes:

inputting one or more instances of the target-language articulatory event-type to a tool configured to facilitate computing a source-language score for any instance of a source-language articulatory event-type in a source language different from the target language, the source-language score quantifying another estimated degree to which the instance of the source-language articulatory event-type indicates the state, with respect to the disease, in which the instance of the source-language articulatory event-type was produced, and computing the target-language score based on computations performed by the tool in response to the inputting.

In some embodiments, the tool includes a neural network trained to predict an accuracy with which a discriminator would estimate the state based on the instance of the source-language articulatory event-type, and computing the target-language score includes computing the target-language score based on respective predicted accuracies output by the neural network in response to the instances of the target-language articulatory event-type.

In some embodiments, the test utterance is a target-language test utterance in the target language, the tool includes a neural-network discriminator configured to process a source-language test utterance in the source language so as to evaluate the state in which the source-language test utterance was produced, and computing the target-language score includes computing the target-language score based on neuronal outputs produced by the neural-network discriminator in response to processing the instances of the target-language articulatory event-type.

In some embodiments, the representations include a segment of a speech sample representing the instance, which speech sample was produced by the subject.

In some embodiments, the method further includes:

obtaining respective outputs, from a discriminator, for multiple training instances of the articulatory event-type, each of the outputs estimating the state in which a different respective one of the training instances was produced; and using the training instances, the outputs, and respective actual states in which the training instances were produced, training a neural network to predict an accuracy of the discriminator for any instance of the articulatory event-type, and computing the score includes computing the score based on the accuracy predicted for the segment by the neural network.

In some embodiments, computing the score includes computing the score based on a neuronal output produced by a neural-network discriminator in response to processing the segment.

There is further provided, in accordance with some embodiments of the present invention, a computer software product including a tangible non-transitory computer-readable medium in which program instructions are stored. The instructions, when read by a processor, cause the processor to compute, based on one or more representations of an articulatory event-type, a score quantifying an estimated degree to which an instance of the articulatory event-type indicates a state, with respect to a disease, in which the instance was produced, and to store or communicate the score for subsequent use in evaluating the state of a subject based on a test utterance produced by the subject.

There is further provided, in accordance with some embodiments of the present invention, a system including a memory configured to store program instructions, and a processor. The processor is configured to load the program instructions from the memory, and by executing the program instructions, to obtain a score quantifying an estimated degree to which an instance of an articulatory event-type indicates a state, with respect to a disease, in which the instance was produced, and to facilitate, using the score, a computer-implemented procedure for evaluating the state of a subject based on a test utterance produced by the subject.

There is further provided, in accordance with some embodiments of the present invention, a method including obtaining, by a processor, a score quantifying an estimated degree to which an instance of an articulatory event-type indicates a state, with respect to a disease, in which the instance was produced. The method further includes, using the score, facilitating, by the processor, a computer-implemented procedure for evaluating the state of a subject based on a test utterance produced by the subject.

In some embodiments, the score quantifies the estimated degree to which any instance of the articulatory event-type indicates the state.

In some embodiments, facilitating the computer-implemented procedure includes selecting content of the test utterance in response to the score.

In some embodiments, facilitating the computer-implemented procedure includes:
computing respective total scores for a plurality of texts, by, for each of the texts:
computing a total-score component as a function of the score for the articulatory event-type and a frequency with which the articulatory event-type is represented in the text, and
computing the total score for the text from the total-score component; and
selecting one of the texts as the content of the test utterance in response to the total scores.

In some embodiments, facilitating the computer-implemented procedure further includes computing respective estimated durations of respective utterances of the texts, and selecting the one of the texts includes selecting the one of the texts in response to the estimated durations.

In some embodiments,
the articulatory event-type is a source-language articulatory event-type in a source language and the score is a source-language score,
the test utterance includes an instance of a target-language articulatory event-type in a target language different from the source language, and facilitating the computer-implemented procedure includes:
ascertaining that the source-language articulatory event-type is more similar to the target-language articulatory event-type, relative to other source-language articulatory event-types in the source language;
in response to ascertaining that the source-language articulatory event-type is more similar to the target-language articulatory event-type, computing a target-language score for the target-language articulatory event-type from the source-language score; and
storing or communicating the target-language score for subsequent use in the computer-implemented procedure.

In some embodiments,
the test utterance includes the instance of the articulatory event-type, and
facilitating the computer-implemented procedure includes modifying the test utterance for the computer-implemented procedure by duplicating the instance of the articulatory event-type by a number of times that is a function of the score.

In some embodiments, the test utterance includes a test instance of the articulatory event-type, and facilitating the computer-implemented procedure includes computing a value indicative of the state of the subject based on the test instance of the articulatory event-type and on the score.

There is further provided, in accordance with some embodiments of the present invention, a computer software product including a tangible non-transitory computer-readable medium in which program instructions are stored. The instructions, when read by a processor, cause the processor to obtain a score quantifying an estimated degree to which an instance of an articulatory event-type indicates a state, with respect to a disease, in which the instance was produced, and to facilitate, using the score, a computer-implemented procedure for evaluating the state of a subject based on a test utterance produced by the subject.

There is further provided, in accordance with some embodiments of the present invention, a method including mapping, by a processor, a test speech sample, which was produced by a subject, to a reference selected from the group of references consisting of: a speech model, and a reference speech sample. The method further includes, based on the mapping, calculating, by the processor, a distance between the test speech sample and the reference such that greater weight is given to one or more speech units known to be more indicative than other speech units with respect to a particular physiological condition. The method further includes, based on the distance, outputting an indication of a state of the subject with respect to the physiological condition.

The present invention will be more fully understood from the following detailed description of embodiments thereof, taken together with the drawings, in which:

BRIEF DESCRIPTION OF THE DRAWINGS

FIGS. 6 and 7A-B are flow diagrams for algorithms for using static discrimination-effectiveness scores to facilitate a computer-implemented procedure for evaluating the state of a subject based on a test utterance produced by the subject, in accordance with some embodiments of the present invention;

FIG. 8 is a flow diagram for an algorithm for computing dynamic discrimination-effectiveness scores, in accordance with some embodiments of the present invention.

DETAILED DESCRIPTION

Terminology

Figure 1:
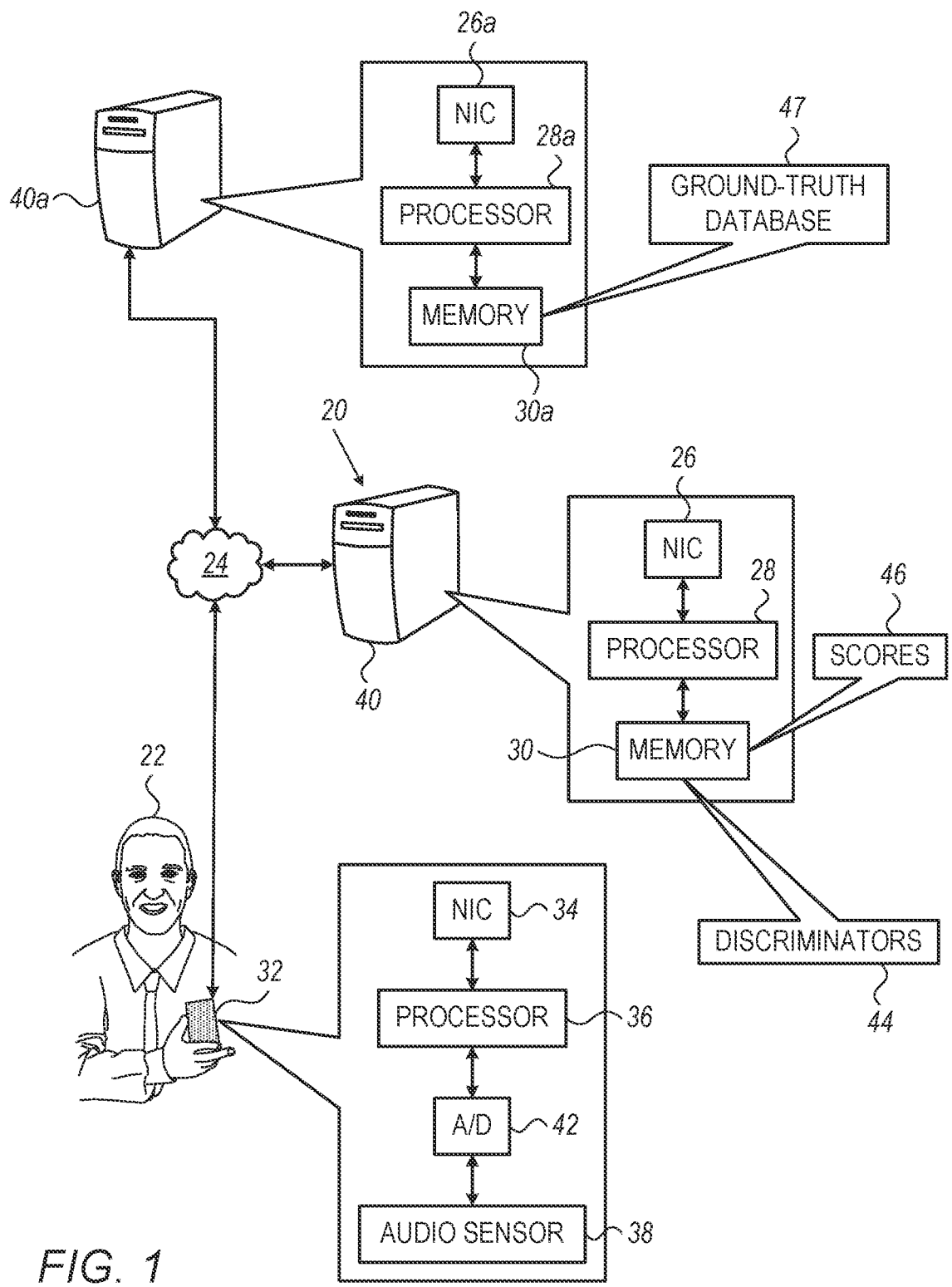
FIG. 1 is a schematic illustration of a system for evaluating the physiological state of a subject, in accordance with some embodiments of the present invention.

In the context of the present application, including the claims, the "state" (or "physiological state") of a subject with respect to a physiological condition (or "disease") may be defined with respect to any relevant factor, such as symptoms experienced by the subject as a result of the condition or the trajectory of the condition, i.e., whether the subject is stable, improving, or deteriorating.

A set of mutually-exclusive states may be discrete or continuous. As an example of a discrete set, a subject may be in an "unstable state" if the subject is suffering from an acute worsening of the condition, or in a "stable state" otherwise. As an example of a continuous set, the state may be represented by a number between 0 and 1 indicating the severity of the subject's symptoms. At any given time, a subject may have multiple overlapping states from different respective sets.

In the context of the present application, including the claims, a "discriminator" refers to a computational tool configured to discriminate between multiple states of a subject based on one or more speech samples produced by the subject. In other words, based on the speech samples, the discriminator evaluates the state in which the speech samples were produced. The output of this evaluation may include, for each state, a binary decision as to whether the speech samples were produced in that state. Alternatively, the output may include a number within a range, which indicates a likelihood that the speech samples were produced in a particular state. (It is noted that the latter type of output may be converted to the former type of output by comparing the number to a threshold.)

A discriminator may include one or more speech models or reference speech signals, and the discrimination between states may be based on distances between the speech samples and the speech models or reference speech signals. Other discriminators, such as neural-network discriminators, do not explicitly compare the speech samples to a speech model or reference signal.

Typically, a discriminator includes a set of parameters determining the operation of the discriminator. Such parameters may include, for example, numerical coefficients, formulae, or labels applying to representations of speech. Some parameters may be learned by the application of machine-learning techniques to speech samples produced while in a known physiological state.

In the context of the present application, including the claims, "obtaining" a data item may include receiving the data item via any suitable audio-capturing interface (e.g., a microphone) or communication interface (e.g., a network interface), loading the data item from a volatile or non-volatile memory, computing the data item, or obtaining the data item in any other way.

In the context of the present application, including the claims, an "articulatory event-type" may include any type of sound produced by the articulatory organs, such as an acoustic unit, a group of acoustic units, a cough, a wheeze, and/or any other non-speech sound. An acoustic unit may include, for example, a phoneme, a phoneme articulated in a specific phonetic context (e.g., within a predefined amount of time of a breathing pause), a transition between phonemes, a diphone, a triphone, a syllable, a vowel, a word, or a sentence. A group of acoustic units may include, for example, a group of any of the types of acoustic units listed above, such as a group of phonemes belonging to a particular class or sub-class (e.g., the group of all segmental phonemes, the group of all vowels, or the group of all stressed vowels), or the group of all sonorant consonants preceding the next breathing pause by less than one second.

Overview

U.S. Pat. Nos. 11,011,188 and 11,024,327, whose respective disclosures are incorporated herein by reference, describe a system for evaluating the state of a subject with respect to a physiological condition by analyzing a test utterance of the subject. For example, by analyzing the test utterance, the system may identify an onset of, or a deterioration with respect to, a physiological condition such as congestive heart failure (CHF), coronary heart disease, atrial fibrillation or any other type of arrhythmia, chronic obstructive pulmonary disease (COPD), asthma, interstitial lung disease, pulmonary edema, pleural effusion, Parkinson's disease, or depression. In response to the evaluation, the system may communicate an output such as an alert to the subject, to the subject's physician, and/or to a monitoring service.

In performing the aforementioned evaluation, the system may use a discriminator including one or more speech models. Alternatively, other types of discriminators, such as neural networks, may be used. In any case, regardless of which type of discriminator is used, it may be challenging to perform an accurate evaluation.

To address this challenge, embodiments of the present invention improve the accuracy of the evaluation by giving greater weight to one or more speech units (e.g., one or more phonemes) known to be more indicative of the subject's condition than are other speech units. More generally, greater weight may be given to one or more articulatory event-types, which may include any speech units and/or non-speech articulatory sounds.

For example, the system may map a test speech sample, which was produced by the subject, to a speech model or a reference speech sample. Subsequently, based on the mapping, the system may calculate a distance between the test speech sample and the speech model or reference speech sample such that greater weight is given to one or more speech units known to be more indicative than other speech units with respect to a particular physiological condition.

Subsequently, based on the distance, the system may output an indication of the state of the subject with respect to the physiological condition.

For example, the system may perform the mapping so as to minimize a first distance. Subsequently to the mapping, the system may recalculate the distance between the test sample and the model or the reference sample, giving greater weight to one or more speech units that are known to be more indicative than others with respect to the particular physiological condition that is being evaluated. The system may then decide whether to generate an alert responsively to the recalculated distance, instead of deciding responsively to the original distance that was minimized during the mapping.

To facilitate this differentiated weighting, embodiments of the present invention calculate respective discrimination-effectiveness scores for various articulatory event-types. Each score quantifies an estimated degree to which production, by a subject, of a different respective one of the articulatory event-types varies as a function of a state of the subject with respect to the condition. (The present specification generally assumes a convention in which a higher score indicates greater discrimination effectiveness; however, it is noted that the opposite convention may alternatively be used.)

In some embodiments, to compute a score for an articulatory event-type, the system first obtains one or more speech samples produced (by the subject on whom the evaluation will be performed and/or any other subjects) in a stable state with respect to the condition, these samples including multiple "stable instances" of the articulatory event-type. The system further obtains one or more other speech samples produced in an unstable state with respect to the condition, these samples including multiple "unstable instances" of the articulatory event-type. Each stable instance is then mapped to the other stable instances and to the unstable instances. Alternatively or additionally, each unstable instance may be mapped to the other unstable instances and to the stable instances. The system further identifies the "same-state distances" between instances of the same state mapped to one another, along with the "cross-state distances" between instances of different states mapped to one another.

Subsequently, the system computes the score based on the same-state distances and cross-state distances. Thus, for example, if the cross-state distances are relatively high and the same-state distances are relatively low, the system may compute a relatively high score.

In other embodiments, the system passes the stable instances and/or unstable instances to a discriminator, such as a neural-network discriminator. (This discriminator is typically different from the discriminator used subsequently to evaluate the state of the subject.) In response to each input instance, the discriminator returns an output indicating an evaluation of the subject's state. Subsequently, the system computes a measure of accuracy of the outputs, and computes the score based on the measure of accuracy. Thus, for example, a relatively high score may be computed for a relatively high measure of accuracy.

In other embodiments, the system passes the stable instances and/or unstable instances to a neural-network discriminator and, for each instance, ascertains a neuronal output produced by the discriminator (i.e., the output of one or more neurons belonging to the discriminator) in response to the instance. Subsequently, the system computes the score based on the neuronal outputs. Thus, for example, given a relatively large number of correct evaluations with relatively high levels of confidence, the system may compute a relatively high score.

In other embodiments, the system obtains a first speech model representing the articulatory event-type as produced in the stable state and a second speech model representing the articulatory event-type as produced in the unstable state. (The speech models may include, for example, Hidden Markov Models (HMMs).) The system then computes a distance between the first model and the second model. The score may then be calculated from the distance. Thus, for example, a relatively high score may be computed for a relatively high distance.

In other embodiments, the system obtains (i) a first, "subject-specific" speech model representing the articulatory event-type as produced by the subject in either one of the states, (ii) a second, "non-subject-specific" speech model representing the articulatory event-type as produced in the same state, and (iii) a third, non-subject-specific speech model representing the articulatory event-type as produced in the other state. The system then computes (a) a same-state distance between the first model and the second model, and (b) a cross-state distance between the first model and the third model. Subsequently, the system computes the score based on the same-state distance and cross-state distance. Thus, for example, if the cross-state distance is relatively high and the same-state distance is relatively low, the system may compute a relatively high score.

In some embodiments, the subject on whom the evaluation is to be performed is required to produce a specific test utterance, which is passed to the relevant discriminator. In such embodiments, alternatively or additionally to using the discrimination-effectiveness scores for differentiated weighting as described above, the system may use the scores to select content of the test utterance. For example, the system may iterate through a database of texts, calculating a total discrimination-effectiveness score for each text based on the respective discrimination-effectiveness scores calculated for the articulatory event-types. For example, the system may calculate the total score based on a plurality of score-components, each score-component being a multiple of (i) the score for an articulatory event-type, and (ii) the number of instances of the articulatory event-type represented in the text. Optionally, the total score may be normalized by the estimated duration of an utterance of the text. The system may then select, as content of the test utterance, the text having the highest total discrimination-effectiveness score.

Embodiments of the present invention further provide techniques for calculating discrimination-effectiveness scores for a target language based on discrimination-effectiveness scores for a source language. Thus, advantageously, an evaluation may be performed based on any test utterance, regardless of the language in which the test utterance is produced.

For example, for each articulatory event-type of interest in the target language, the system may identify one or more articulatory event-types in the source language that are most similar to the articulatory event-type of interest. Subsequently, the system may compute the score for the articulatory event-type of interest as a weighted average of the respective scores for the identified articulatory event-types.

In some embodiments, rather than computing a single "static score" for an articulatory event-type, the system computes a "dynamic score" for each instance of an articulatory event-type in the subject's test utterance, such that multiple instances of the same articulatory event-type may have different respective dynamic scores. Subsequently, the dynamic scores may be used for differentiated weighting of the instances in the evaluation performed by a discriminator, as described above for the static scores.

For example, during a training phase, multiple training instances of one or more articulatory event-types, each of which was produced while in a known state, may be passed to a discriminator. The discriminator may output, for each training instance, an estimation of the physiological state in which the training instance was produced. These outputs, together with the training instances and the "ground truth," i.e., the actual states in which the training instances were produced, may then be used to train a neural network to predict the accuracy of the discriminator for any instance of the articulatory event-types. Subsequently, a dynamic score may be computed for any instance of any of the articulatory event-types for which the training was performed, based on the accuracy predicted by the neural network for the instance.

Alternatively, for example, each instance of an articulatory event-type may be passed to a neural-network discriminator, and a dynamic score for the instance may then be computed based on a neuronal output, such as a level of confidence, produced by the discriminator in response to processing the instance.

In some embodiments, a tool configured to facilitate computing dynamic discrimination-effectiveness scores for a source language is used to calculate static discrimination-effectiveness scores for a target language. In particular, for each articulatory event-type of interest in the target language, the system inputs one or more instances of the articulatory event-type to the tool. Based on computations performed by the tool, the system calculates a static score for the articulatory event-type.

For example, the tool may include a neural network trained to output a predicted accuracy for any input articulatory event-type instance, as described above. Based on the predicted accuracies output by the neural network in response to the instances of the target-language articulatory event-type, the system may calculate a static score for the target-language articulatory event-type. Alternatively, for example, the tool may include a neural-network discriminator, and the system may compute the static score based on neuronal outputs, such as levels of confidence, produced by the discriminator in response to the instances of the target-language articulatory event-type.

In some embodiments, a static score for an articulatory event-type is computed from the respective dynamic scores of multiple instances of the articulatory event-type. For example, the static score may be computed as the mean or median of the dynamic scores.

In some embodiments, in response to the computed static or dynamic discrimination-effectiveness scores, the system, after receiving the test utterance from the subject, modifies the test utterance by duplicating one or more instances of a higher-scoring articulatory event-type present in the utterance. For example, the system may duplicate a syllable having a relatively high score. Subsequently, an evaluation is performed based on the modified test utterance.

It is noted that in the context of the present application, including the claims, the terms "speech signal" and "speech sample" may be used interchangeably. Moreover, the present application may substitute a reference to an utterance with a reference to a speech signal representing the utterance, and vice versa. For example, instead of referring to a modification of a speech signal representing a test utterance, the present application may, for simplicity, refer to a modification of the test utterance itself. Likewise, the present application may substitute a reference to an instance of an articulatory event-type with a reference to a segment of a speech signal representing the instance, and vice versa. For example, a discriminator may be said to operate either on an instance of an articulatory event-type or on a segment of a speech signal representing the instance.

System Description

Reference is initially made to FIG. 1, which is a schematic illustration of a system 20 for evaluating the physiological state of a subject 22 with respect to a condition such as any of those mentioned above in the Overview, in accordance with some embodiments of the present invention.

System 20 comprises an audio-receiving device 32, such as a mobile phone, a tablet computer, a laptop computer, a desktop computer, a voice-controlled personal assistant (such as an Amazon Echo™ or a Google Home™ device), a smart speaker device, or a dedicated medical device used by subject 22. Device 32 comprises circuitry comprising an audio sensor 38 (e.g., a microphone), which converts sound waves to analog electric signals, an analog-to-digital (A/D) converter 42, a processor 36, and a communication interface 34, such as a network interface controller (NIC). Typically, device 32 further comprises a volatile and/or non-volatile memory (e.g., a solid-state drive), a screen (e.g., a touch-screen), and/or other user interface components, such as a keyboard or a speaker. In some embodiments, audio sensor 38 (and, optionally, A/D converter 42) belong to a unit that is external to device 32. For example, audio sensor 38 may belong to a headset that is connected to device 32 by a wired or wireless connection, such as a Bluetooth connection.

System 20 further comprises a server 40. Server 40 comprises circuitry comprising a processor 28, a memory 30 comprising a non-volatile memory (e.g., a hard drive or flash drive) and/or a volatile memory (e.g., Random Access Memory (RAM)), and a communication interface 26, such as a NIC. Server 40 may further comprise a screen, a keyboard, and/or any other suitable user interface components. Typically, server 40 is located remotely from device 32, e.g., in a control center, and server 40 and device 32 communicate with one another, via their respective communication interfaces, over a network 24, which may include a cellular network and/or the Internet.

System 20 is configured to perform a computer-implemented procedure for evaluating the physiological state of subject 22 based on a test utterance produced by the subject. In particular, system 20 is configured to evaluate the subject's state by processing at least one speech signal representing the test utterance.

Typically, processor 36 of device 32 and processor 28 of server 40 cooperatively perform the receiving and processing of the speech signal. For example, as the subject utters the test utterance into device 32, the sound waves of the subject's speech may be converted to an analog signal by audio sensor 38. The analog signal may be sampled and digitized by A/D converter 42. (In general, the test utterance may be sampled at any suitable rate, such as a rate of between 8 and 45 kHz.) The resulting digital speech signal may be received by processor 36. Processor 36 may then communicate the speech signal, via communication interface 34, to server 40, such that processor 28 receives the speech signal via communication interface 26. Subsequently, processor 28 may process the speech signal.

In some embodiments, device 32 comprises an analog telephone that does not comprise an A/D converter or a processor. In such embodiments, device 32 sends the analog audio signal from audio sensor 38 to server 40 over a telephone network. Typically, in the telephone network, the audio signal is digitized, communicated digitally, and then converted back to analog before reaching server 40. Accordingly, server 40 may comprise an A/D converter, which converts the incoming analog audio signal—received via a suitable telephone-network interface—to a digital speech signal. Processor 28 receives the digital speech signal from the A/D converter, and then processes the signal as described above. Alternatively, server 40 may receive the signal from the telephone network before the signal is converted back to analog, such that the server need not necessarily comprise an A/D converter.

In some embodiments, as described in detail below with reference to the subsequent figures, processor 28 is configured to compute respective discrimination-effectiveness scores 46 for various articulatory event-types or instances thereof. Subsequently to computing scores 46, processor 28 may store the scores in memory 30 for subsequent use in facilitating the evaluation of the subject's state. Alternatively, processor 28 may communicate scores 46 to another processor (e.g., processor 36), and the other processor may then use the scores to evaluate the subject's state. As yet another alternative, scores 46 may be computed by another processor or manually by a user. Processor 28 or processor 36 may then receive and use the scores.

In some embodiments, scores 46 are computed based on one or more speech samples and/or speech models. Each of these samples and models may be obtained by processor 28 or processor 36 via any suitable data-transfer interface, such as communication interface 26 or a flash-drive interface.

Typically, one or more discriminators 44 are stored in memory 30, each discriminator 44 being configured to discriminate between various physiological states based on at least one instance of an articulatory event-type. For example, based on at least one instance of an articulatory event-type, a discriminator 44 may output an indication of a likelihood of the instance having been produced in a particular physiological state (e.g., a stable state). As described in detail below, some discriminators may be used to calculate scores 46, while other discriminators may be used to evaluate the state of subject 22 based on the test utterance of the subject.

Alternatively, discriminators 44 may be stored in a memory belonging to device 32, and device 32 may use the discriminators as described herein.

Subsequently to evaluating the state of the subject, processor 28 may communicate any suitable audio or visual output to at least one other device, which may belong to the subject, the subject's physician, or a monitoring center. For example, processor 28 may communicate the output to processor 36, and processor 36 may then communicate the output to the subject, e.g., by displaying a message on the screen of device 32. The output may be communicated, for example, by placing a call or sending a message (e.g., a text message). As a specific example, in response to the discriminator outputting a relatively high likelihood that the subject's state is unstable, the processor may communicate an alert indicating that the subject should take medication or visit a physician. Alternatively or additionally, the processor may control a medication-administering device so as to adjust an amount of medication administered to the subject.

In some embodiments, system 20 further comprises an auxiliary server 40a comprising a processor 28a, a memory 30a comprising a volatile and/or non-volatile memory, and a communication interface 26a, such as a NIC. Memory 30a is configured to store a ground-truth database 47, which may contain speech samples associated with respective indicators indicating the states in which the speech samples were produced, speech models, and/or any other relevant data.

In such embodiments, based on the data in ground-truth database 47, processor 28a may perform some of the functionality ascribed herein to processor 28. For example, processor 28a may compute the discrimination-effectiveness scores and communicate the scores to processor 28 via communication interface 26a. Alternatively or additionally, for example, processor 28a may train a neural network (e.g., for facilitating the computation of the scores) or choose content for a test utterance, and then communicate the neural network or content to processor 28.

It is thus to be understood that the various processes described hereinbelow as being performed by "the processor" may be performed by any one of processor 36, processor 28, and processor 28a, or cooperatively performed by any two, or all, of these processors.

Each of the processors described herein may be embodied as a single processor, or as a cooperatively networked or clustered set of processors. Alternatively or additionally, any one of the processors described herein may belong to a virtual machine.

For each of the processors described herein, the functionality of the processor may be implemented solely in hardware, e.g., using one or more fixed-function or general-purpose integrated circuits, Application-Specific Integrated Circuits (ASICs), and/or Field-Programmable Gate Arrays (FPGAs). Alternatively, this functionality may be implemented at least partly in software. For example, the processor may be embodied as a programmed processor comprising, for example, a central processing unit (CPU) and/or a Graphics Processing Unit (GPU). Program code, including software programs, and/or data may be loaded for execution and processing by the CPU and/or GPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Each of the memories described herein is configured to store program instructions that may be loaded and executed by a processor so as to perform the functionality described herein.

Computing Static Discrimination-Effectiveness Scores Based on Speech Samples

Figure 2:
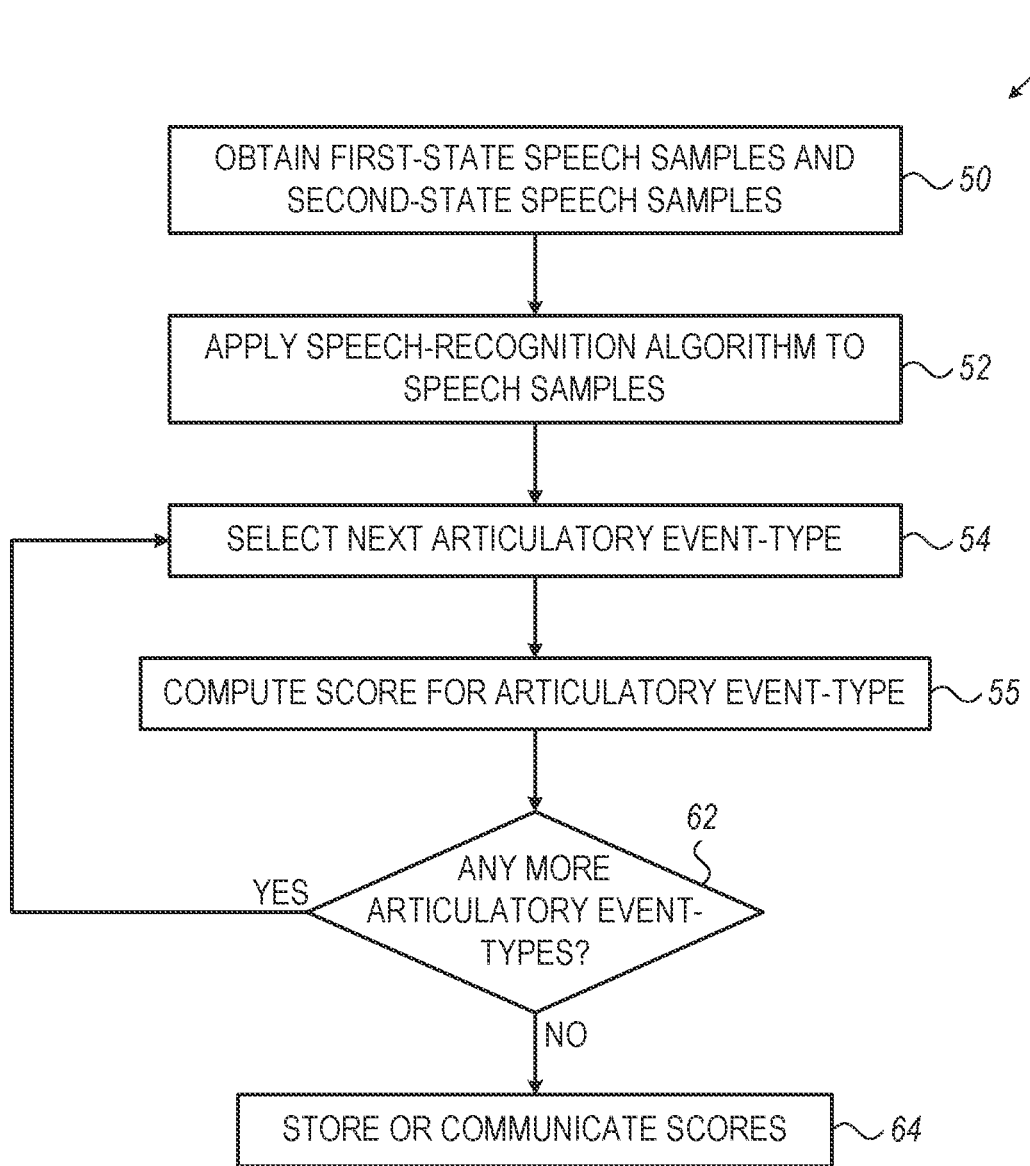
FIG. 2 is a flow diagram for an algorithm for computing discrimination-effectiveness scores, in accordance with some embodiments of the present invention.

Reference is now made to FIG. 2, which is a flow diagram for an algorithm 48 for computing scores 46, in accordance with some embodiments of the present invention. Per algorithm 48, each score quantifies an estimated degree to which any instance of a particular articulatory event-type indicates the state, with respect to a disease, in which the instance was produced. Thus, per algorithm 48, the computed scores are static, in that all instances of a given articulatory event-type share the same score.

Algorithm 48 begins with a sample-obtaining step 50, at which the processor obtains one or more first-state speech samples, which were produced by any one or more subjects while in a first state (e.g., a stable state) with respect to the disease, and one or more second-state speech samples, which were produced by any one or more subjects while in a second state (e.g., an unstable state) with respect to the disease.

Following sample-obtaining step 50, the processor, at a segment-identifying step 52, identifies one or more segments of the speech samples, each segment representing at least one respective articulatory event-type of interest, by applying a speech-recognition algorithm to the speech samples. The identified segments of the first-state speech samples are referred to hereinbelow as "first-state segments," and those of the second-state speech samples are referred to as "second-state segments."

For example, the processor may identify ten segments of the first-state speech samples, and another eight segments of the second-state speech samples, representing the phoneme "/r/," along with six segments of the first-state speech samples, and another seven segments of the second-state speech samples, representing the phoneme "/s/."

It is noted that a segment may represent more than one articulatory event-type of interest. For example, the articulatory event-types of interest may include a particular vowel along with the group of all vowels, such that each segment representing the vowel represents two different articulatory event-types.

In some embodiments, the speech-recognition algorithm includes an algorithm for speaker-independent, large-vocabulary connected speech recognition described in chapters 7-8 of L. Rabiner and B-H. Juang, Fundamentals of Speech Recognition, Prentice Hall, 1993, whose disclosure is incorporated herein by reference. One example of such an algorithm is the One Stage Dynamic Programming algorithm, described in Section 7.5 of Rabiner and Juang, and further described in Ney, Hermann, "The use of a one-stage dynamic programming algorithm for connected word recognition," IEEE Transactions on Acoustics, Speech, and Signal Processing 32.2 (1984): 263-271, whose disclosure is incorporated herein by reference. To identify phonemes or other sub-words, these algorithms may be used in combination with techniques for sub-word recognition, such as those described in Sections 8.2-8.4 of Rabiner and Juang. A language model, described in Sections 8.5-8.7 of Rabiner and Juang, may be used to facilitate this sub-word recognition.

Alternatively, the segments of the speech samples may be labeled manually.

Alternatively, provided the speech samples represent utterances of prescribed text (rather than free speech), the processor may map each unlabeled speech sample to a labeled signal representing an utterance of the same text. Subsequently, each segment of the speech sample may be given the label(s) of the corresponding segment to which it is mapped. The mapping may be performed, for example, using the Dynamic Time Warping (DTW) algorithm, which is described below with reference to FIG. 3A.

For example, provided at least one of the speech samples obtained at sample-obtaining step 50 is labeled, the processor may map each unlabeled speech sample to the labeled speech sample. (This mapping may be performed, in any case, when executing some embodiments of score-computing step 55, e.g., as described below with reference to FIG. 3A.) Alternatively, each unlabeled speech sample may be mapped to a labeled signal representing a synthetic utterance of the prescribed text, which was produced by a speech synthesizer.

Next, the processor iterates through the articulatory event-types of interest, selecting each such articulatory event-type at an articulatory-event-type-selecting step 54. For each selected articulatory event-type, the processor, at a score-computing step 55, computes a discrimination-effectiveness score for the articulatory event-type. Various example embodiments of score-computing step 55 are described below with reference to FIGS. 3A-C.

Subsequently to computing the score, the processor, at a checking step 62, checks whether any more articulatory event-types of interest remain. If yes, the processor returns to articulatory-event-type-selecting step 54 and selects the next articulatory event-type. Otherwise, the processor, at a score-handling step 64, stores or communicates the computed scores for subsequent use in evaluating the state of a subject based on instances of the articulatory event-types in a test utterance produced by the subject.

Figure 3B:
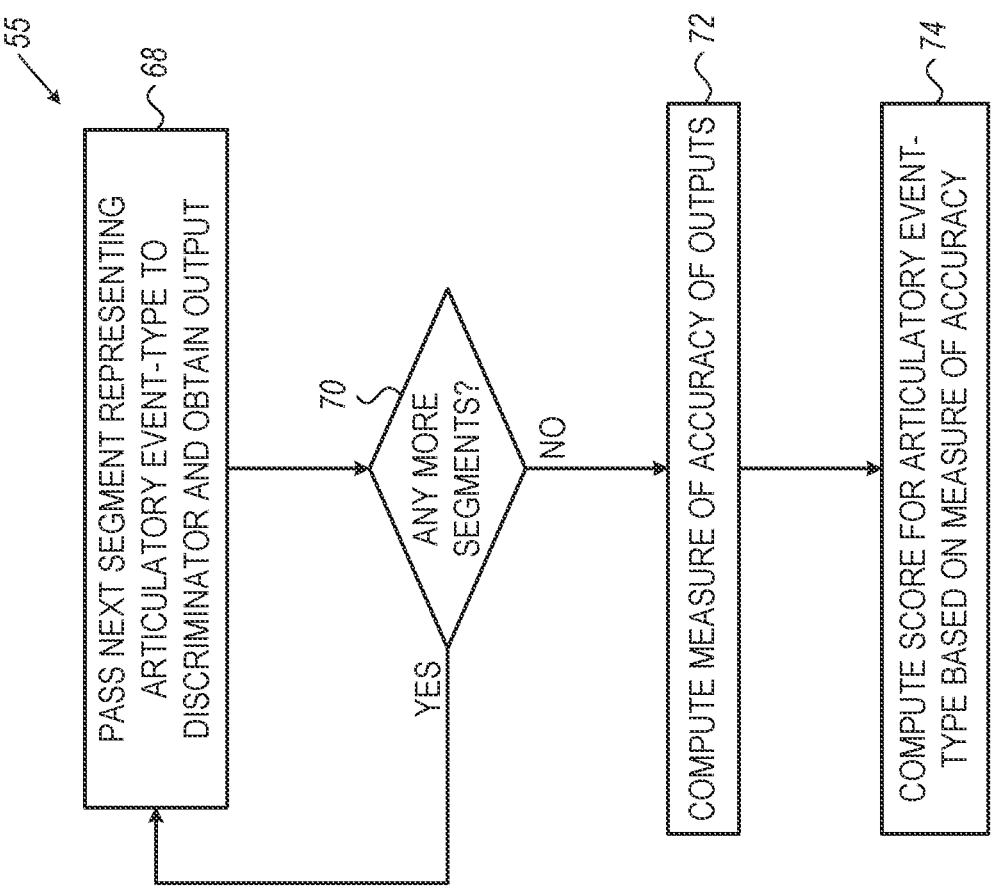
FIGS. 3A-C are flow diagrams for a score-computing step, in accordance with some embodiments of the present invention.
Figure 3A:
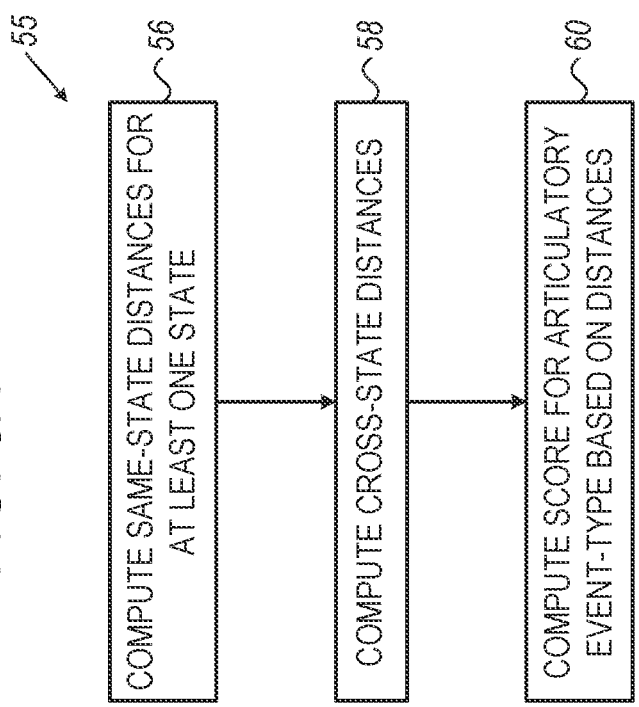

Reference is now made to FIG. 3A, which is a flow diagram for score-computing step 55, in accordance with some embodiments of the present invention.

In some embodiments, score-computing step 55 begins with a same-state-distance-computing sub-step 56, at which the processor computes one or more same-state distances for at least one state, e.g., the stable or unstable state. Each same-state distance represents the distance between a different respective pair of segments belonging to the state.

In some embodiments, to compute each of the same-state distances, the processor maps a respective pair of the segments for the state to one another so as to minimize a distance between the pair. The same-state distance for the pair is then derived from this mapping.

In other words, using the notation $s_i^{u,l}$ to indicate the $i^{th}$ segment representing the lth articulatory event-type for the $u^{th}$ state where u=1 for the first state and u=2 for the second state, the processor performs one or more same-state mappings between two segments $s_i^{u,l}$ and $s_j^{u,l}$, i≠j. For example, the processor may map each pair of segments to one another, such that, given a total of N segments, the processor performs $$\binom{N}{2}$$

mappings. Each same-state mapping between $s_i^{u,l}$ and $s_j^{u,l}$ minimizes the distance $d(s_i^{u,l}, s_j^{u,l})$ between the segments, and the same-state distance $d_{i,j}^{u,l}$ is derived from the mapping.

In such embodiments, prior to performing the same-state mappings, the processor typically divides each segment $s_i^{u,l}$ into one or more frames, each frame having a length, for example, of 10-100 ms. Subsequently, the processor extracts a respective feature vector from each frame, thus obtaining a sequence $V_i^{u,l}$ of feature vectors for the segment. $d(s_i^{u,l}, s_j^{u,l})$ is defined as the distance $d(V_i^{u,l}, V_j^{u,l})$, and the processor maps $V_i^{u,l}$ to $V_j^{u,l}$ so as to minimize $d(V_i^{u,l}, V_j^{u,l})$. Each feature vector may include, for example, a representation of the spectral envelope of the frame from which the feature vector was extracted. The representation of the spectral envelope may include, for example, linear prediction coefficients and/or cepstral coefficients.

One example algorithm that may be used for each same-state mapping is the Dynamic Time Warping (DTW) algorithm, which is described in Sakoe and Chiba, "Dynamic Programming Algorithm Optimization for Spoken Word Recognition," IEEE Transactions on Acoustics, Speech, and Signal Processing 26.2 (1978): 43-49, whose disclosure is incorporated herein by reference. This algorithm finds a sequence of K pairs of indices $\{(t_1, r_1), \ldots, (t_K, r_K)\}$, where each index $t_k$ is the index of a first feature vector in $V_i^{u,l}$ and each index $r_k$ is the index of a second feature vector in $V_j^{u,l}$, such that each pair of indices $(t_k, r_k)$ represents a correspondence between the first and second feature vectors. For example, the correspondence between the tenth feature vector in $V_i^{u,l}$ and the eleventh feature vector in $V_j^{u,l}$ is represented by the pair of indices (10,11).

Typically, the sequence of index-pairs must satisfy some predefined validity constraints. Examples for such constraints include:

Monotonicity and continuity: $t_k \leq t_{k+1}, r_k \leq$ $r_{k+1}$, and $0 < (r_{k+1} + t_{k+1}) - (r_k + t_k) \leq 2$, for $k = 1, \ldots, K - 1$ A constrained slope: $1 \leq t_{k+2} - t_k \leq$ $2$ and $1 \leq r_{k+2} - r_k \leq 2$, for $k = 1, \ldots, K - 2$ Boundary conditions: $t_1=1, r_1=1, t_K=|V_i^{u,l}|$, and $r_K=|V_j^{u,l}|$, where $|V_i^{u,l}|$ is the number of feature vectors in $V_i^{u,l}$ and, likewise, $|V_j^{u,l}|$ is the number of feature vectors in $V_j^{u,l}$.

Given any particular sequence of index-pairs, $d(s_i^{u,l}, s_j^{u,l})=d(V_i^{u,l}, V_j^{u,l})$ may be defined as $\Sigma_{k=1}^{K} \Delta(V_i^{u,l}[t_k], V_j^{u,l}[r_k])w_k$, where $V_i^{u,l}[t_k]$ is the $t_k^{th}$ feature vector in $V_i^{u,l}$, $V_j^{u,l}[r_k]$ is the $r_k^{th}$ feature vector in $V_j^{u,l}$, $\Delta(\circ)$ is a local distance between the two feature vectors that may utilize any suitable geometric or non-geometric distance measure, and $w_k$ is a weight applied to the local distance. In some embodiments, $w_1=2$ and $w_k=(r_k+t_k)-(r_{k-1}+t_{k-1})$ for $k=2, \ldots, K$, such that the sum of the weights is $|V_i^{u,l}|+|V_j^{u,l}|$. Alternatively, $d(s_i^{u,l}, s_j^{u,l})=d(V_i^{u,l}, V_j^{u,l})$ may be derived from the local distances in any other suitable way.

An example of a geometric distance measure is the L2 distance measure. An example of a non-geometric distance measure is the Itakura-Saito distance measure between vectors of linear-prediction (LPC) coefficients, which is described in section 4.5.4 of L. Rabiner and B-H. Juang, Fundamentals of Speech Recognition, Prentice Hall, 1993, whose disclosure is incorporated herein by reference.

In some embodiments, the set of same-state distances $\{d_{i,j}^{u,l}\}$, which quantify the similarity of the segments to each other, are identical to the set of minimized distances $\{d(s_i^{u,l}, s_j^{u,l})\}$. In other embodiments, $d_{i,j}^{u,l}$ is different from $d(s_i^{u,l}, s_j^{u,l})$ for at least one pair of segments. For example, for embodiments in which $d(s_i^{u,l}, s_j^{u,l})=\Sigma_{k=1}^{K} \Delta(V_i^{u,l}[t_k], V_j^{u,l}[r_k])w_k$, $d_{i,j}^{u,l}$ may be calculated as $\Sigma_{k=1}^{K} \Delta(V_i^{u,l}[t_k], V_j^{u,l}[r_k])w'_k$, where $w'_k \neq w_k$ for at least one value of k. Alternatively or additionally, $d_{i,j}^{u,l}$ may be calculated by applying a different operator to the local distances; for example, instead of a weighted sum of the local distances, du may be calculated as the square root of a weighted sum of the squares of the local distances.

Subsequently (or prior) to performing same-state-distance-computing sub-step 56, the processor, at a cross-state-distance-computing sub-step 58, computes one or more cross-state distances. Each cross-state distance represents the distance between a respective one of the first-state segments and a respective one of the second-state segments.

In some embodiments, to compute each of the cross-state distances, the processor first maps the pair of segments to one another. For example, assuming $N_1$ first-state segments and $N_2$ second-state segments, the processor may perform $N_1 * N_2$ cross-state mappings. Each cross-state mapping between two segments $s_i^{1,l}$ and $s_j^{2,l}$ minimizes the distance $d(s_i^{1,l}, s_j^{2,l})$ between the segments. As for the same-state mappings, the processor may perform each cross-state mapping between two segments $s_i^{1,l}$ and $s_j^{2,l}$ by mapping $V_i^{1,l}$ to $V_j^{2,l}$, e.g., using the DTW algorithm. As noted above for the same-state distances $\{d_{i,j}^{u,l}\}$, the cross-state distances $\{c_{i,j}^{l}\}$, which quantify the similarity of the first-state segments to the second-state segments, may be different from the distances $\{d(s_i^{1,l}, s_j^{2,l})\}$ minimized in the mapping.

In some cases, at least one pair of segments that are to be mapped to one another (either in a same-state mapping or a cross-state mapping) belong to different respective speech samples representing the same content. In such cases, the entire speech samples may be mapped to one another. Subsequently, for each pair of segments mapped to one another, the distance between the pair of segments may be identified.

In other embodiments, the processor performs a variation of same-state-distance-computing sub-step 56 and cross-state-distance-computing sub-step 58. In particular, at same-state-distance-computing sub-step 56, the processor computes multiple same-state distances between respective ones of the first-state segments and a first-state model representing the articulatory event-type as produced while in the first state. Similarly, at cross-state-distance-computing sub-step 58, the processor computes multiple cross-state distances between respective ones of the first-state segments and a second-state model representing the articulatory event-type as produced while in the second state. Alternatively, the same-state distances and cross-state distances may be computed for respective ones of the second-state segments, rather than the first-state segments.

In such embodiments, each of the models may be subject-specific—i.e., constructed from speech of subject 22 (FIG. 1), for whom the score will be used, without speech of any other subjects—or non-subject-specific, i.e., constructed from speech of one or more other subjects. Each of the models may include an HMM, for example.

For example, to compute the distance between a segment $s_i^{u,l}$ and an HMM, the processor may first map the segment to the model. For example, the processor may first obtain $V_i^{u,l}$ as described above. Subsequently, the processor may find a sequence of indices $\{m_k\}$ such that each feature vector $V_i^{u,l}[k]$ is mapped to an acoustic state $\theta[m_k]$ belonging to the model. $\theta[m_k]$ may be any acoustic state to which there is an allowed transition from $\theta[m_{k-1}]$.

In particular, the mapping of each feature vector $V_i^{u,l}[k]$ to $\theta[m_k]$ yields a local distance $\Delta_k$ between $V_i^{u,l}[k]$ and $\theta[m_k]$. The total distance between the segment and the model may be defined as $\Sigma_{k=1}^{K}\Delta_k$, K being the total number of feature vectors in $V_i^{u,l}$. Alternatively, if transition distances are included in the model, the total distance may be defined as $\Sigma_{k=1}^{K}\Delta_k+\Sigma_{k=1}^{K-1}y_{k,k+1}$, where $y_{k,k+1}$ is the transition distance from $\theta[m_k]$ to $\theta[m_{k+1}]$, or as any other suitable function of the local distances $\{\Delta_k\}$. The processor may therefore find $\{m_k\}$ for which this total distance is minimized. For example, the processor may use the Viterbi algorithm, which is described in section 6.4.2 of the aforementioned reference to Rabiner and Juang, whose disclosure is incorporated herein by reference.

Subsequently to performing each mapping, the processor may define the same-state or cross-state distance as the distance minimized in the mapping. Alternatively, the processor may calculate the same-state or cross-state distance as a different function of the local distances $\{\Delta_k\}$ and, optionally, the transition distances along the mapping path $\{m_k\}$. Alternatively or additionally to using a different function, the processor may compute the same-state or cross-state distance as a function of alternate local distances $\{\Delta'_k\}$.

In yet other embodiments, the processor performs same-state-distance-computing sub-step 56 and cross-state-distance-computing sub-step 58 by inputting the first-state speech segments and second-state speech segments to a trained neural network configured to return the same-state distances and cross-state distances in response to the input.

Subsequently to computing the same-state and cross-state distances, the processor, at a score-computing sub-step 60, computes a discrimination-effectiveness score for the articulatory event-type, based on the same-state distances and cross-state distances.

For example, the processor may compute respective counts for multiple segments, each of which is one of the first-state segments or one of the second-state segments. Subsequently, the processor may compute the score based on the counts.

In particular, to compute the counts, the processor may first select at least some of the first-state and second-state segments. For example, the processor may select all the first-state segments and/or all the second-state segments. Alternatively, the processor may select a number of segments, at random, from the first-state and second-state segments.

Subsequently, for each of the selected segments, the processor may identify, from a set S of distances including those of the same-state distances associated with the segment and those of the cross-state distances associated with the segment, a subset S', which includes, for a positive integer q, q smallest ones of the distances. (It is noted that, for any segment $s_i^{u,l}$, $S=\{d_{i,j}^{u,l}\} \cup \{c_{i,j}^{\ l}\}$.) Subsequently, the processor may compute the count for the segment as (i) a number $v$ of the distances in S' that are same-state distances, or (ii) $q-v$.

Subsequently, the score may be computed from the counts in any suitable way. For example, for embodiments in which the count is $v$, the processor may compute $v_{avg}$, the average of $v$ over all the segments for which $v$ was computed. Subsequently, the processor may compute the score as $(v_{avg}-\mu)/\sigma$, where $\mu$ and $\sigma$ are the mean and standard deviation, respectively, of the distribution of $v$ under the assumption that the same-state distances and cross-state distances have the same distribution, i.e., that the articulatory event-type has no discriminatory power at all. For example, for embodiments in which the processor selects all the first-state segments and second-state segments:

$\mu=(N^{1,l}+N^{2,l})*q*p'$, $N_{u,l}$ being the number of segments in $\{s_i^{u,l}\}$ for u=1 or 2 and p' being $1-2p(1-p)$, where $p=N^{1,l}/(N^{1,l}+N^{2,l})$; and $$\sigma = \sqrt{\mu \frac{(1-p')}{2p'}}.$$

In other embodiments, the processor computes the score by comparing a statistic of the same-state distances to a statistic of the cross-state distances. For example, the processor may compute the statistic $d_{avg}$, which is the average of the same-state distances, and the statistic $c_{avg}$, which is the average of the cross-state distances. The score may then be calculated as $d_{avg}/c_{avg}$.

Reference is now made to FIG. 3B, which is a flow diagram for score-computing step 55, in accordance with some embodiments of the present invention.

In some embodiments, score-computing step 55 begins with an iterative process in which the processor passes the first-state segments and/or second-state segments, which were identified at segment-identifying step 52 (FIG. 2) as representing the articulatory event-type, to a discriminator 44 (FIG. 1). The processor thus obtains respective outputs for the segments from the discriminator, each of the outputs estimating, for a different respective one of the segments, the physiological state in which the segment was produced. Subsequently, the processor computes a score based on a measure of accuracy of the outputs.

More specifically, the processor, at a segment-passing sub-step 68, passes a segment to the discriminator and obtains the resulting output. The processor then checks, at a checking sub-step 70, whether any more segments remain. If yes, the processor returns to segment-passing sub-step 68 and passes the next segment to the discriminator. Otherwise, the processor, at a measure-computing sub-step 72, computes a measure of accuracy of the outputs. Subsequently, at a score-computing sub-step 74, the processor computes a score for the articulatory event-type based on the measure of accuracy.

In general, the output of the discriminator may have any suitable discrete or continuous range. As an example of a continuous range, the output may include a likelihood between 0 and 1 that the subject is in the first state. As another example, the output may include a ratio between (i) the distance between the input and a stable-state reference, and (ii) the distance between the input and an unstable-state reference. Alternatively, there may be an infinite number of physiological states spanning a continuous range, and the output may indicate any one of these states. For example, the subject's state may be defined as the concentration of a particular hormone in the subject's blood, the amount of fluid in the subject's lungs, or the value of any other physiological parameter. In such embodiments, at the time each speech sample is collected, the relevant parameter may be measured, and this "ground-truth" measure may be associated with the sample. Subsequently, at sample-obtaining step 50 (FIG. 2), the processor may obtain the speech samples together with the associated ground-truth measures.

In some embodiments, the discriminator includes a neural-network discriminator. The neural-network discriminator may be trained, for example, on a large set of utterances, each utterance being labeled with the physiological state of the subject who produced the utterance at the time the utterance was produced.

In other embodiments, the discriminator operates by comparing the test speech to one or more speech models. For example, for each input segment, the discriminator may compute (i) a first total distance between the segment and a first speech model (e.g., a first HMM) representing speech in the first state, and (ii) a second total distance between the segment and a second speech model (e.g., a second HMM) representing speech in the second state. Alternatively, the discriminator may compute (e.g., using the DTW algorithm) (i) a first total distance between the segment and a first reference signal representing speech in the first state, and (ii) a second total distance between the segment and a second reference signal representing speech in the second state. Subsequently, if the first total distance is less than the second total distance, the discriminator may output the first state; otherwise, the discriminator may output the second state.

In general, the measure of accuracy may be computed in any suitable way. For example, for embodiments in which the discriminator output is discrete (e.g., indicating either the first state or the second state), the measure of accuracy may be computed as the percentage of outputs that are correct. For example, if the output for a first-state segment indicates the first state, the output is correct; if the output indicates the second state instead, the output is incorrect.

Alternatively, for embodiments in which the discriminator output is continuous, the processor may, for each output, compute the absolute value of the difference between the output and the true state. Subsequently, the processor may compute the measure of accuracy as a statistic (e.g., a mean or median) of the absolute values.

In general, the score may be computed as any suitable function of the measure of accuracy. (Per the convention used in the present description, a higher score indicates greater discrimination-effectiveness, such that the latter function is a monotonically increasing function.) For example, the score may be computed as the measure of accuracy itself.

In other embodiments, particularly those in which the discriminator includes a recurrent neural network, the processor does not pass the segments individually to the discriminator as described above. Rather, following segment-identifying step 52 and prior to articulatory-event-type-selecting step 54 (FIG. 2), the processor passes each of the speech samples, in its entirety, to the discriminator. Subsequently, at score-computing step 55, the score for each articulatory event-type is computed based on the accuracy of the outputs, with statistical methods used to compute the contribution of the articulatory event-type to the accuracy. For example, given N speech samples $S_1, \ldots S_N$ passed to the discriminator, the processor may compute the score for an articulatory event-type A as $$\frac{\sum_{n=1}^{N} c(S_n, A) g(S_n)}{\sum_{n=1}^{N} c(S_n, A)},$$

where:
- $c(S_n, A)$ is the number of times that the articulatory event-type A appears in the sample $S_n$; and
- $g(S_n)$ is a measure of accuracy of the output of the discriminator for $S_n$. For example, for a discrete output, $g(S_n)$ may equal 1 for a correct output and 0 for an incorrect output. For a continuous output, $g(S_n)$ may equal the absolute value of the difference between the output and the true state.

In some embodiments, the processor computes the score based on neuronal outputs produced by a neural-network discriminator in response to evaluating, based on each of the segments, the state in which the segment was produced. For example, based on the neuronal output for each of the segments, the processor may calculate a level of confidence with which the evaluation was made. Subsequently, the processor may compute the score based on the level of confidence.

Figure 3C:
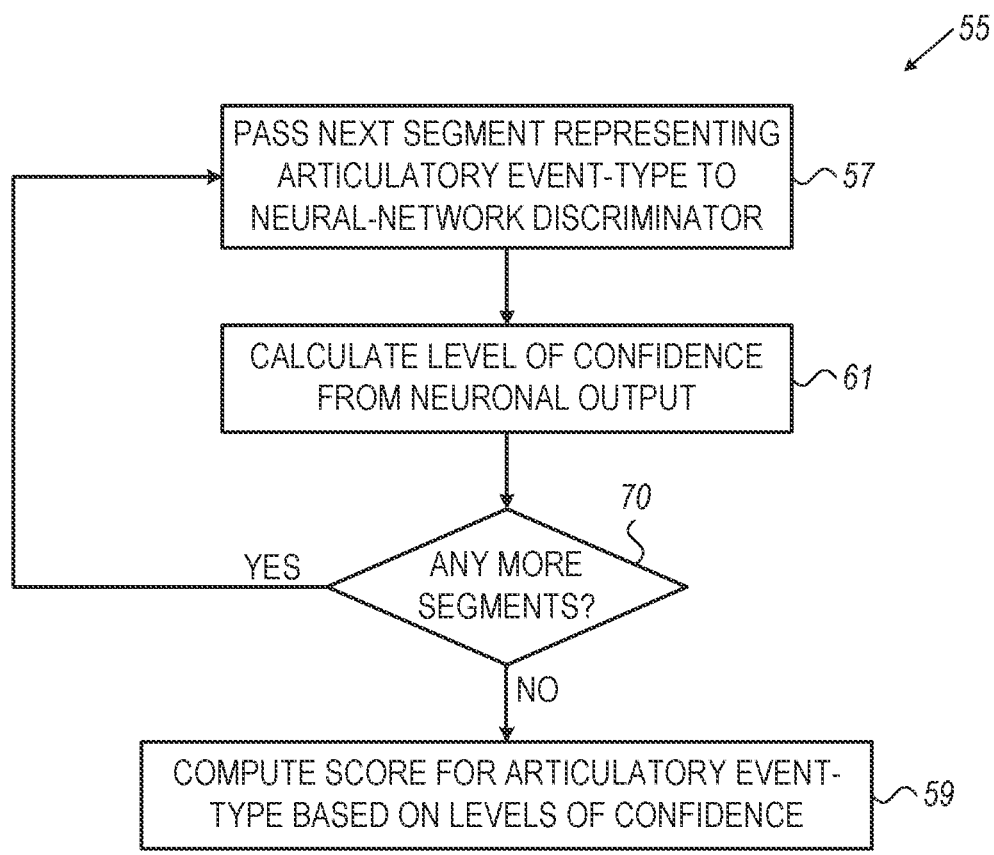

In this regard, reference is now made to FIG. 3C, which is a flow diagram for score-computing step 55, in accordance with some embodiments of the present invention.

Score-computing step 55 begins with an iterative process in which the processor passes the first-state segments and/or second-state segments, which were identified at segment-identifying step 52 (FIG. 2) as representing the articulatory event-type, to the neural-network discriminator. Each segment is passed to the neural network at a segment-passing sub-step 57. Subsequently to passing the segment to the neural network, the processor, at a calculating step 61, calculates the level of confidence with which the neural network assesses the physiological state in which the segment was produced.

In general, the level of confidence may be calculated from the output of any one or more neurons in any one or more layers of the neural network. For example, the output layer of the neural network may include a neuron whose output is between 0 and 1, with 0 representing one state and 1 representing the other state. Alternatively or additionally, one or more neurons belonging to an inner layer of the neural network may output a value between 0 and 1, with values closer to 0.5 corresponding to a lower level of confidence. In such cases, the processor may compute the confidence level for each neuron as $2*|x-0.5|$, x being the output of the neuron, and then compute the overall confidence level from the confidence levels of the individual neurons, e.g., by computing an average of these confidence levels.

Next, at a checking sub-step 70, the processor checks whether any segments remain. If yes, the processor returns to segment-passing sub-step 57 and passes the next segment to the discriminator. Otherwise, the processor performs a score-computing sub-step 59, at which the processor computes a score based on the levels of confidence.

In some embodiments, to compute the score, the processor first computes respective score-components for the segments, each of the score-components having (i) a magnitude that is an increasing function of the level of confidence with which the evaluation based on the segment to which the score-component belongs was made, and (ii) a sign that depends on whether the evaluation is correct. For example, the score-component may equal $\beta*\alpha^\rho$, where:
- $\beta=1$ or $-1$, depending on whether the evaluation is correct;
- $\alpha$ is the level of confidence; and
- $\rho>0$ (e.g., $\rho$ may be 1).

Subsequently, the processor computes the score based on the score-components. Typically, the score equals the output of any suitable function that is increasing with respect to each of the score-component arguments. For example, the score may equal the sum, average, median, or root-mean-square of the score-components. Thus, assuming a convention in which $\beta=1$ for a correct evaluation, each correct evaluation contributes a positive score-component, thus increasing the score, while each incorrect evaluation contributes a negative score-component, thus decreasing the score.

Alternatively, the processor may ignore incorrect evaluations, and calculate the score based only on the levels of confidence with which correct evaluations are performed. (In such embodiments, the processor need not necessarily ascertain the levels of confidence for incorrect evaluations.) For example, the score-component for each segment on which a correct evaluation was performed may equal $\alpha^\rho$. (Equivalently, it may be said that the score-component for each segment is $\beta*\alpha^\rho$, where $\beta=1$ for a correct evaluation and $\beta=0$ for an incorrect evaluation.)

More generally, the score may be based on the neuronal outputs in any other suitable way. For example, letting W represent the output of a particular neuron or a value computed from the outputs of one or more particular neurons, the processor may compute each score-component as $\beta*W^\rho$, and then compute the score from the score-components as described above.

Computing Static Discrimination-Effectiveness Scores Based on Speech Models

Figure 4:
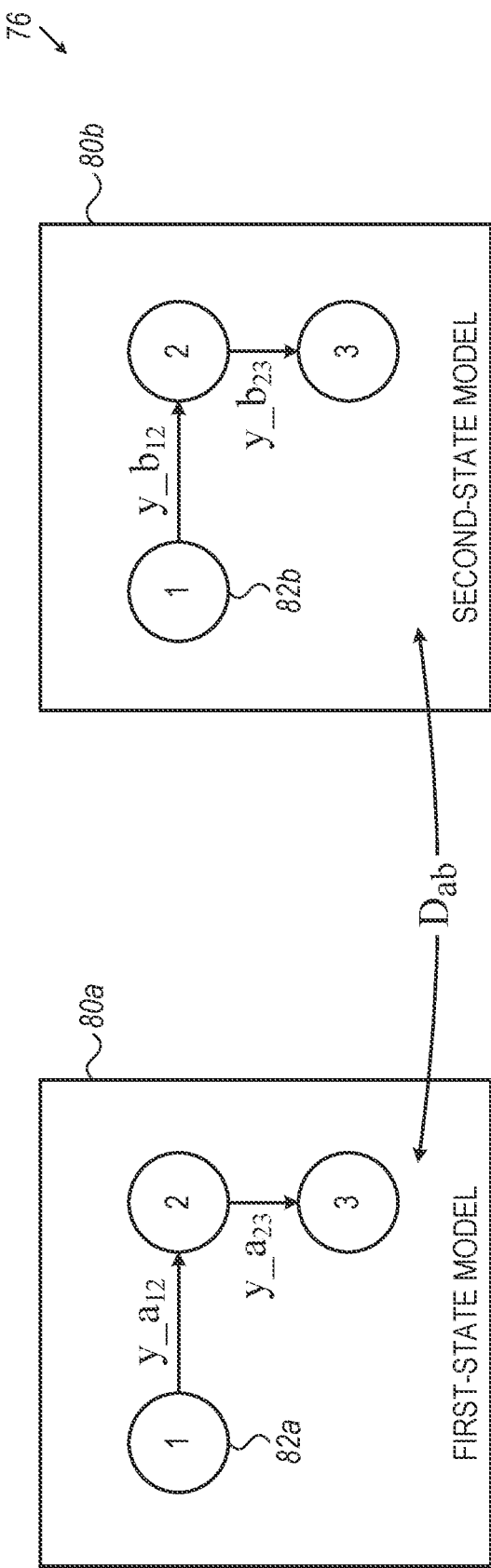
FIGS. 4-5 are schematic illustrations of techniques for calculating a discrimination-effectiveness score, in accordance with some embodiments of the present invention.

Reference is now made to FIG. 4, which is a schematic illustration of a technique 76 for calculating a discrimination-effectiveness score, in accordance with some embodiments of the present invention.

Similarly to algorithm 48 (FIG. 2), technique 76 calculates a static score for each articulatory event-type of interest. However, technique 76 differs from algorithm 48 with respect to the representations of the articulatory event-type on which the score is based. In particular, in algorithm 48, the score is based on respective segments of one or more speech samples. In contrast, in technique 76, the score is based on one or more speech models, such as one or more HMMs. Each of the models may be subject-specific (i.e., based on reference speech samples from the subject for whom the score is to be used) or non-subject-specific.

For example, FIG. 4 shows a first-state model 80a representing an articulatory event-type as produced while in the first state with respect to the disease. First-state model 80a includes one or more model-states 82a along with a definition of allowed transitions between the states and, optionally, transition distances between the states. For example, FIG. 4 shows a transition distance $y\_a_{12}$ between the first and second model-states, and a transition distance $y\_a_{23}$ between the second and third model states.

FIG. 4 further shows a second-state model 80b representing the articulatory event-type as produced while in the second state. Second-state model 80b includes one or more model-states 82b along with a definition of allowed transitions between the states and, optionally, transition distances between the states. For example, FIG. 4 shows a transition distance $y\_b_{12}$ between the first and second model-states, and a transition distance $y\_b_{23}$ between the second and third model states.

Per technique 76, for each articulatory event-type of interest, the processor first computes the distance $D_{ab}$ between first-state model 80a and second-state model 80b. For example, an HMM model defines a probability distribution on a space of finite sequences of feature vectors. Hence, for HMM models, the processor may compute the distance between the models as a function of the dissimilarity between the respective probability distributions defined by the models. This dissimilarity may be calculated, for example, as the Kullback-Leibler divergence. Alternatively, the distance between the HMM models may be computed as described in Zeng, Jianping, Jiangjiao Duan, and Chengrong Wu, "A new distance measure for hidden Markov models," Expert systems with applications 37.2 (2010): 1550-1555 or Falkhausen, Markus, Herbert Reininger, and Dietrich Wolf, "Calculation of distance measures between hidden Markov models," Eurospeech, 1995, whose respective disclosures are incorporated herein by reference.

Subsequently to computing the distance between the models, the processor computes the score based on the distance. For example, the score may be computed as any suitable increasing function of the distance, such as $D_{ab}/(1+D_{ab})$.

In some embodiments, the processor computes multiple distances between respective pairs of first-state and second-state models. For example, multiple distances may be computed for different respective subjects based on respective subject-specific first-state models and subject-specific second-state models for the subjects. In such embodiments, the processor may compute the score based on the multiple distances. For example, the score may be any suitable increasing function of a statistic of the distances, such as $D'/(1+D')$ where $D'$ is the root-mean-square of the distances.

Figure 5:
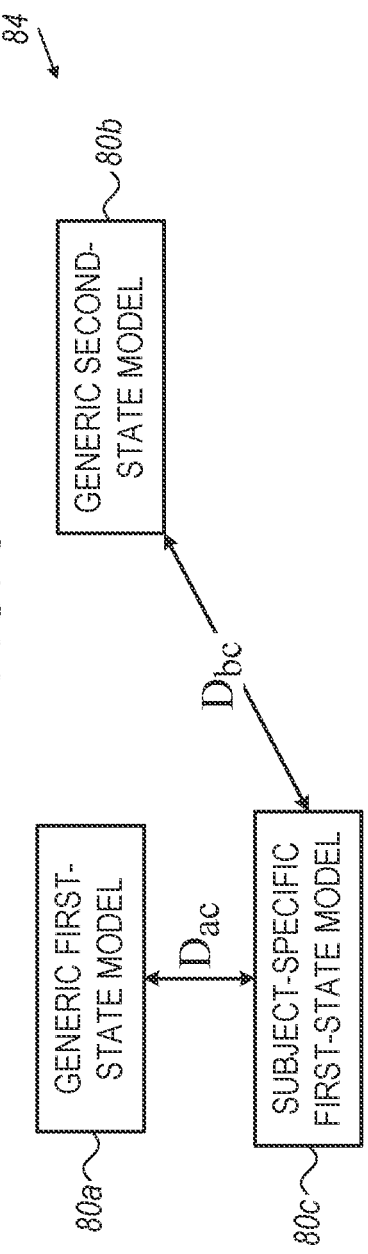

Reference is now made to FIG. 5, which is a schematic illustration of another technique 84 for calculating a discrimination-effectiveness score, in accordance with some embodiments of the present invention.

Similarly to technique 76 (FIG. 4), technique 84 calculates a static score for each articulatory event-type of interest. However, technique 84 requires that first-state model 80a and second-state model 80b be non-subject-specific or "generic," i.e., that each of these models represent the articulatory event-type as produced by multiple subjects not necessarily including the subject for whom the score is to be used. Technique 84 further requires that the articulatory event-type also be represented by a subject-specific model 80c, which represents the articulatory event-type as produced by the subject while in the first state or the second state. For example, the description of FIG. 5 below assumes that subject-specific model 80c represents the articulatory event-type as produced by the subject while in the first state.

Per technique 84, the processor first computes a same-state distance $D_{ac}$ quantifying the similarity of models 80a and 80c to one another, and a cross-state distance $D_{bc}$ quantifying the similarity of models 80b and 80c to one another. Each of the distances may be computed, for example, as described above with reference to FIG. 4.

Subsequently to computing the distances, the processor computes the score based on the distances. For example, the score may be computed as $D_{bc}/D_{ac}$ or as a monotonic function of this ratio.

In other embodiments, the processor combines aspects of technique 76 (FIG. 4) with aspects of technique 84. For example, the score may be computed as $D_{ab}/D_{ac}$ or as a monotonic function of this ratio, or as $C1-C2*D_{ab}/D_{bc}$, where C1 and C2 are predefined constants. Alternatively, the processor may adjust the score computed per technique 76 in response to $D_{ac}$. As a specific example, the score computed per technique 76 may be multiplied by $\min(1, C3*D_{ab}/D_{ac})$, where C3 is a predefined constant.

Using Static Discrimination-Effectiveness Scores

Reference is now made to FIG. 6, which is a flow diagram for an algorithm 86 for using static discrimination-effectiveness scores to facilitate a computer-implemented procedure for evaluating the state of subject 22 based on a test utterance produced by the subject, in accordance with some embodiments of the present invention.

Algorithm 86 begins with a score-obtaining step 88, at which the processor obtains one or more static discrimination-effectiveness scores for different respective articulatory event-types of interest. For example, after calculating the scores (e.g., as described above with reference to any of FIGS. 2-5) and storing the scores in memory 30 (FIG. 1), the processor may load the scores from memory 30. Alternatively, for example, the processor may receive the scores from another processor over a computer network.

Subsequently to obtaining the scores, the processor selects the content of the test utterance in response to the scores. For example, based on the scores, the processor may compute respective total scores for a plurality of texts, and then, in response to the total scores, select one of the texts as the content of the test utterance. For example, the total score for a first text "Hello, how are you today?" may be greater than the total score for a second text "I am so hungry," indicating that the first text has greater discrimination effectiveness than the second text. Hence, the processor may select the first text for the test utterance, such that each evaluation of the subject's state is based on an utterance of the first text by the subject.

For example, in some embodiments, the processor iterates through a database of texts, loading each text at a text-loading step 90. (Alternatively or additionally, the processor may iterate through a sequence of randomly-generated texts, and/or texts posted at various websites.) For each text, the processor computes respective total-score components for the articulatory event-types of interest, at a component-computing step 92. Typically, each total-score component is a function of the score for the articulatory event-type and the frequency with which the articulatory event-type is represented in the text. For example, the total-score component $z_i$ for the $i^{th}$ articulatory event-type may equal $DES_i * n_i$, where $DES_i$ is the score for the articulatory event-type and $n_i$ is the number of representations of the articulatory event-type in the text. (For example, for the phoneme /a/ in the text "I am happy," $n_i=2$.)

In some embodiments, the processor also computes an estimated duration of an utterance of the text, at an estimated-duration-computing step 94. For example, the processor may time the duration of an utterance of the text by a human, or of a synthesized utterance of the text produced by a speech synthesizer. Alternatively, the processor may identify the types of articulatory events represented in the text along with the frequency with which each articulatory event-type is represented. Subsequently, the processor may estimate the duration using a predefined function (e.g., in the form of a lookup table) that assigns an estimated duration to each articulatory event-type. In some such embodiments, the function may be constant, assigning the same estimated duration to each articulatory event-type. Thus, for example, the processor may estimate the duration simply by (i) counting the number of phonemes represented in the text, and (ii) multiplying this number by a constant.

Subsequently, at a score-computing step 96, the processor computes a total score for the text from the total-score components and, if computed, the estimated duration of the text. For example, the total score may equal $\Sigma_i z_i$ or $(\Sigma_i z_i)/T$, where T is the estimated duration of the text.

Subsequently, the processor checks, at a checking step 98, whether any more texts remain to be loaded. If yes, the processor returns to text-loading step 90 and loads the next text. Otherwise, at a text-selecting step 100, the processor selects one of the texts as content of the test utterance, in response to the total scores. For example, the processor may select the text having the highest total score.

Alternatively to the processor performing algorithm 86, a human expert may compose the content of the test utterance responsively to the discrimination-effectiveness scores.

Figure 7A:
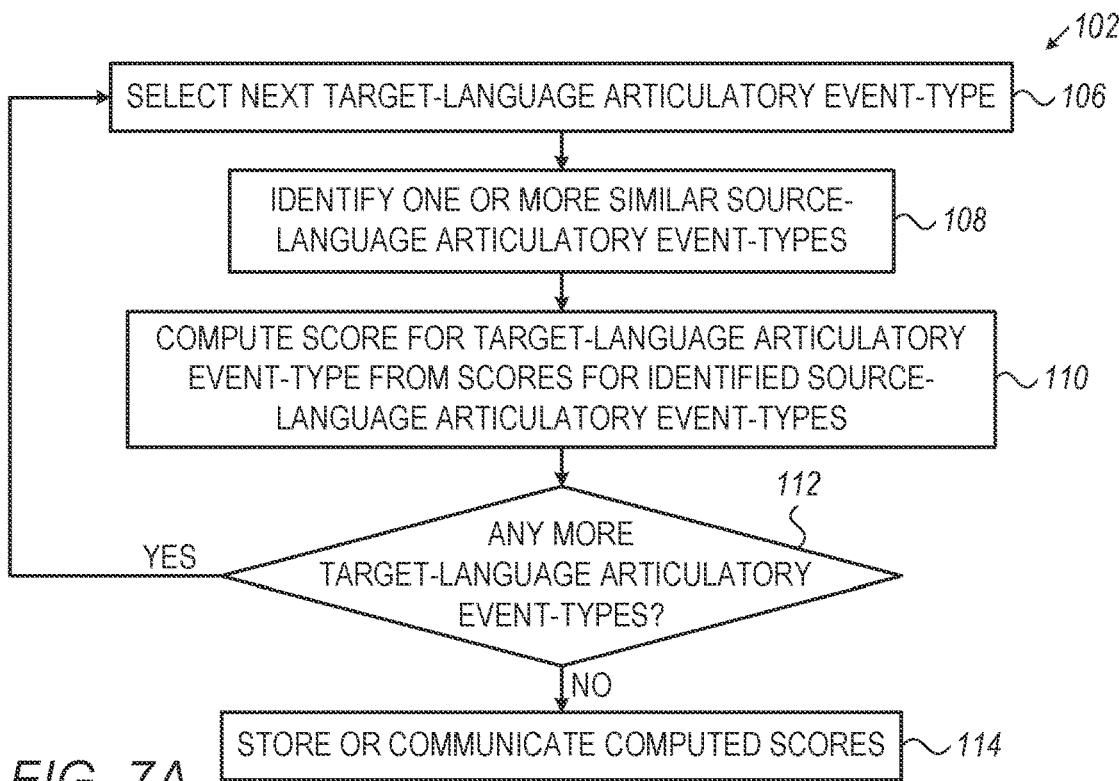

Reference is now made to FIG. 7A, which is a flow diagram for another algorithm 102 for using static discrimination-effectiveness scores to facilitate a computer-implemented procedure for evaluating the state of subject 22 based on a test utterance produced by the subject, in accordance with some embodiments of the present invention.

By way of introduction, it is noted that algorithm 102 addresses a scenario in which one or more static discrimination-effectiveness scores have been computed for respective articulatory event-types in a source language (e.g., as described above with reference to any one of FIGS. 2-5), but such scores have not been computed for a target language in which the scores are required. For example, the target-language scores may be required to better evaluate the state of a subject based on a test utterance of the subject in the target language, and/or to select content of the test utterance.

Algorithm 102 begins with a selecting step 106, at which the processor selects an articulatory event-type of interest $A2_{i0}$ in the target language. For example, the processor may select $A2_{i0}$ from an online database of articulatory event-types $\{A2_i\}$, or identify $A2_{i0}$ in a body of text composed in the target language, such as the text of the test utterance.

Subsequently to selecting $A2_{i0}$, the processor, at an identifying step 108, identifies, from the source-language articulatory event-types $\{A1_j\}$ for which discrimination-effectiveness scores were computed, one or more source-language articulatory event-types that are more similar to $A2_{i0}$, relative to other source-language articulatory event-types. For example, the processor may compute a distance between $A2_{i0}$ and each of $\{A1_j\}$. Subsequently, the processor may identify those articulatory event-types in $\{A1_j\}$ having the k smallest distances to $A2_{i0}$, k being one, two, or three, for example.

For example, the processor may obtain one or more speech samples in the target language, in which instances of $A2_{i0}$ are labeled. The processor may further obtain, for each source-language articulatory event-type $A1_j$, one or more speech samples in the source language, in which instances of $A1_j$ are labeled. The processor may then compute the distance between each instance of $A1_j$ and each instance of $A2_{i0}$, e.g., using the DTW algorithm. Subsequently, the processor may identify the minimum distance computed for each instance of $A2_{i0}$. The distance between $A2_{i0}$ and $A1_j$ may then be computed as the average of the identified minimum distances.

Alternatively, for each $A1_j$, the processor may obtain a model representing $A1_j$. The processor may then compute the respective distances between the instances of $A2_{i0}$ and the model, and compute the distance between $A2_{i0}$ and $A1_j$ as the minimum of these distances. As yet another alternative, the processor may compute the distance between $A2_{i0}$ and $A1_j$ as the distance between the aforementioned model and another model representing $A2_{i0}$.

In some embodiments, in computing the aforementioned cross-language distances, the processor uses techniques described in Sooful, Jayren J., and Elizabeth C. Botha, "An acoustic distance measure for automatic cross-language phoneme mapping," Prasa 1 (2001): 99-102 or Kohler, Joachim, "Multi-lingual phoneme recognition exploiting acoustic-phonetic similarities of sounds," Proceeding of Fourth International Conference on Spoken Language Processing, ICSLP'96. Vol. 4, IEEE, 1996, whose respective disclosures are incorporated herein by reference.

In response to identifying the most similar source-language articulatory event-types, the processor, at a score-computing step 110, computes a discrimination-effectiveness score for $A2_{i0}$ from the scores for the identified source-language articulatory event-types. For example, for a single identified source-language articulatory event-type (i.e., for k=1), the processor may simply assign the score to $A2_{i0}$. For multiple identified source-language articulatory event-types, the processor may assign a weighted average of the scores to $A2_{i0}$, the weights being a function of the respective similarities of the identified source-language articulatory event-types to $A2_{i0}$. For example, for k=2, the score of the most similar source-language articulatory event-type may have a weight of ⅔, and the score of the other source-language articulatory event-type may have a weight of ⅓. Alternatively, the weight of each score may be inversely proportional to the distance of the source-language articulatory event-type from $A2_{i0}$.

Subsequently to computing the score, the processor checks, at a checking step 112, whether any more target-language articulatory event-types remain. If yes, the processor returns to selecting step 106. Otherwise, the processor performs a score-handling step 114, at which the processor stores or communicates the computed scores for subsequent use in a computer-implemented procedure for evaluating the state of the subject based on an utterance of the subject in the target language.

Another Technique for Computing Static Scores for a Target Language

Figure 7B:
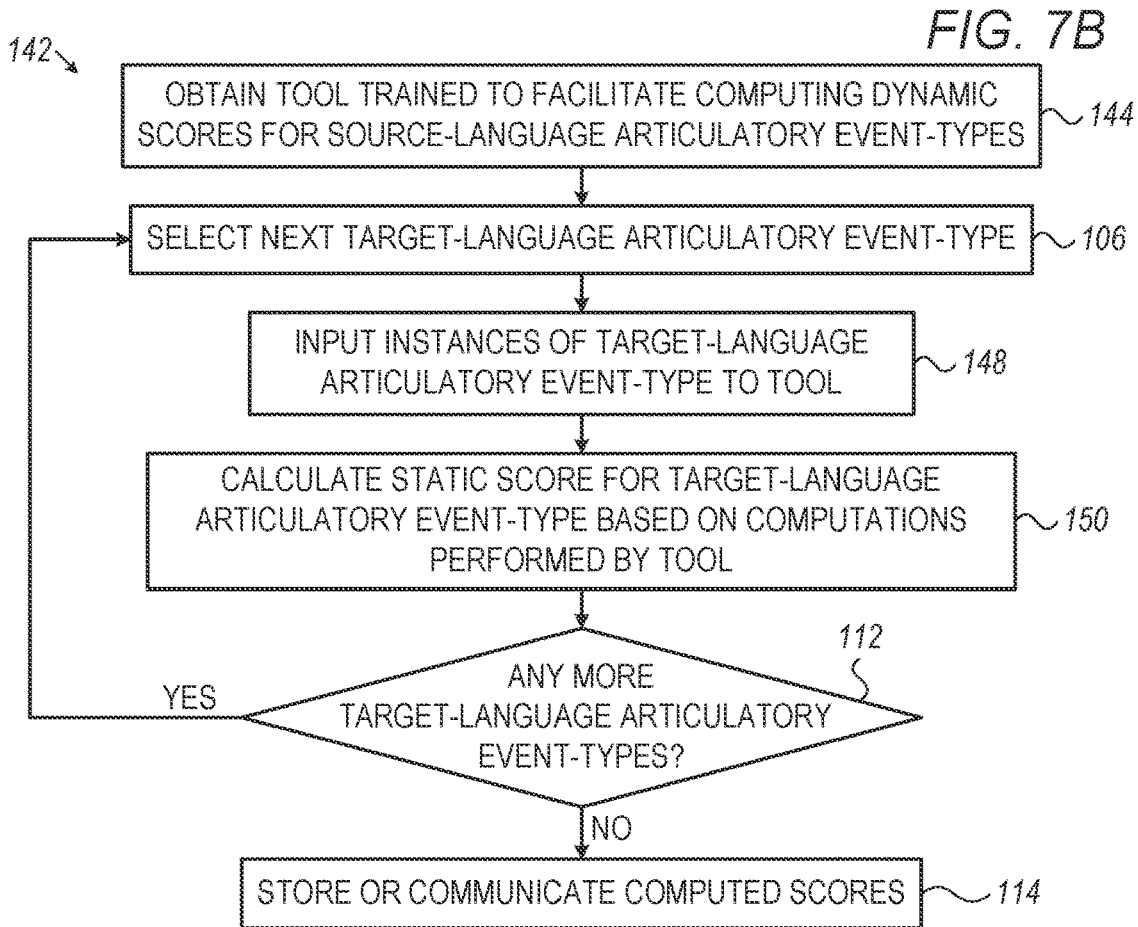

Reference is now made to FIG. 7B, which is a flow diagram for another algorithm 142 for facilitating a computer-implemented procedure for evaluating the state of subject 22 based on a test utterance produced by the subject, in accordance with some embodiments of the present invention. Similarly to algorithm 102 (FIG. 7A), algorithm 142 computes static discrimination-effectiveness scores for a target language based on prior work performed for a source language.

Algorithm 142 begins with an obtaining step 144, at which the processor obtains a tool configured (e.g., as described below with reference to FIG. 8) to facilitate computing dynamic discrimination-effectiveness scores for a source language. In other words, the tool is configured to facilitate computing a source-language score for any instance of a source-language articulatory event-type in the source language, the source-language score quantifying an estimated degree to which the instance indicates the state in which the instance was produced (i.e., uttered).

In some embodiments, the tool includes a neural network trained to predict the accuracy with which a discriminator would estimate the state of the subject based on an instance of a source-language articulatory event-type. Such a neural network may be trained, for example, as described below with reference to FIG. 8. In other embodiments, the tool includes a neural-network discriminator configured to process a source-language test utterance so as to evaluate the state in which the source-language test utterance was produced.

Subsequently to obtaining the tool, the processor, for each one of multiple articulatory event-types in the target language, inputs, to the tool, one or more instances of the articulatory event-type. Based on computations performed by the tool in response to the inputting, the processor calculates respective scores for the target-language articulatory event-types. Subsequently, the processor stores or communicates the scores for subsequent use in a computer-implemented procedure for evaluating the state of a subject based on a test utterance in the target language.

For example, in some embodiments, the processor selects each target-language articulatory event-type at selecting step 106. Subsequently to selecting the articulatory event-type, the processor, at an inputting step 148, inputs one or more instances of the articulatory event-type to the tool. It is noted that each instance may have been produced by any subject or by a speech synthesizer. Optionally, the speech synthesizer may produce multiple utterances in different respective voices, accents, and/or dialects, so as to provide a diverse collection of instances of the articulatory event-type.

Subsequently, the processor, at a score-calculating step 150, calculates a static score for the target-language articulatory event-type based on computations performed by the tool.

For example, for an accuracy-predicting neural network, the processor may calculate the static score based on respective predicted accuracies output by the neural network in response to the instances of the target-language articulatory event-type. For example, the score may be based on (e.g., the score may be the average of) respective score-components $h^p$ of the instances, where h is a measure of predicted accuracy output by the neural network and p is as described above with reference to FIG. 3C.

Alternatively, for a neural-network discriminator, the processor may calculate the static score based on neuronal outputs produced by the neural-network discriminator in response to processing the instances of the target-language articulatory event-type. For example, the score may be based on (e.g., the score may be the average of) respective score-components $\alpha_p$ or $W^p$ of the instances, where $\alpha$, W, and p are as described above with reference to FIG. 3C.

Subsequently to calculating the score, the processor performs checking step 112, as described above with reference to FIG. 1A. Subsequently to calculating all the scores, the processor performs score-handling step 114.

Computing Dynamic Discrimination-Effectiveness Scores

In some embodiments, the scores used to facilitate evaluating the subject's state are dynamic, in that different instances of the same articulatory event-type in the subject's test utterance may have different scores. In such embodiments, typically, the score for each instance of an articulatory event-type is based on a single representation of the articulatory event-type—namely, a speech-sample segment that was produced by the subject and represents the instance.

In this regard, reference is now made to FIG. 8, which is a flow diagram for an algorithm 116 for computing dynamic discrimination-effectiveness scores, in accordance with some embodiments of the present invention.

In some embodiments, algorithm 116 begins with an inputting step 152. At inputting step 152, the processor, for each of one or more articulatory event-types, inputs multiple training instances of the articulatory event-type to a discriminator and obtains the resulting outputs from the discriminator. (Alternatively, the inputting may be performed by a different processor, and the processor may obtain the outputs by reading the outputs from a file or receiving the outputs over a communication interface.) Each of the outputs estimates the state in which a different respective one of the training instances was produced.

Subsequently, at a training step 154, the processor trains a neural network to predict the accuracy of the discriminator for any instance of any one of the articulatory event-types. This training is performed using the training instances, the outputs of the discriminator, and the ground truth, i.e., the respective actual states in which the training instances were produced.

In other embodiments, algorithm 116 begins with an obtaining step 156, at which the processor obtains a neural-network discriminator.

Subsequently to training the accuracy-predicting neural network or obtaining the neural-network discriminator, the processor obtains the subject's test speech sample, which represents the test utterance, at a sample-obtaining step 118. Subsequently, at a segment-identifying step 120, the processor applies a speech-recognition algorithm to the test speech sample so as to identify segments of the sample representing respective articulatory event-types. Next, at a segment-passing step 122, the processor passes a segment to the neural network. Subsequently, at a score-computing step 124, the processor computes the dynamic score for the segment based on output of the neural network.

For example, for embodiments in which the processor utilizes an accuracy-predicting neural network, the processor computes the score based on the accuracy predicted for the segment by the neural network. In general, the score may be any suitable increasing function of the predicted accuracy such as $h^p$, where h and p are as described above with reference to FIG. 7B.

Alternatively, for embodiments in which the processor utilizes a neural-network discriminator, the score may be based on neuronal output produced by the neural-network discriminator in response to processing the segment. For example, the score may be computed as $\alpha^p$ or $W^p$, where $\alpha$, W, and p are as described above with reference to FIG. 3C.

The processor then checks, at a checking step 126, whether any identified segments remain. If yes, the processor returns to segment-passing step 122 and passes the next segment of the test speech sample to the neural-network discriminator. Otherwise, the processor, at score-handling step 64, stores or communicates the scores for subsequent use in evaluating the state of the subject based on the test utterance. (Typically, the evaluation is performed by a discriminator different from the neural-network discriminator used in algorithm 116.)

Other Uses of Static or Dynamic Scores

In some embodiments, given a static score for a particular articulatory event-type, the processor modifies the test utterance produced by the subject by duplicating at least one instance of the articulatory event-type by a number of times that is a function of the score. (In other words, the processor modifies the test speech sample representing the test utterance, by duplicating a segment of the speech sample representing the instance.) Given the typical convention in which a higher score indicates greater discrimination effectiveness, the number of times is an increasing function of the score.

For example, if the phoneme /m/ has a relatively high score, the processor may modify the test utterance "I am feeling fine" by duplicating the phoneme /m/, such that the test utterance is changed to, for example, "I am-m-m feeling fine."

Similarly, given a dynamic score for a particular instance of an articulatory event-type, the processor may duplicate the instance by a number of times that is a function of the score. For example, if the instance of /ai/ in "fine" has a relatively high score, the processor may change the test utterance to, for example, "I am feeling fi-i-i-ne."

Subsequently to modifying the test utterance, the processor may evaluate the state of the subject based on the modified test utterance. Alternatively, the processor may store or communicate the modified test utterance for subsequent use.

In some embodiments, the computation performed in evaluating the subject's state is based on discrimination-effectiveness scores that were previously computed. In other words, the processor (using a discriminator) computes a value indicative of the state of the subject based on (i) a test utterance produced by the subject, and (ii) respective static scores for one or more articulatory event-types represented in the test utterance and/or respective dynamic scores for one or more test instances in the test utterance. Advantageously, this computation may have greater accuracy, relative to a computation that is not based on any scores.

For example, the processor may input the subject's test utterance, together with the scores, to a neural-network discriminator. The discriminator may then compute a value indicative of the state of the subject based on the input.

Figure 9:
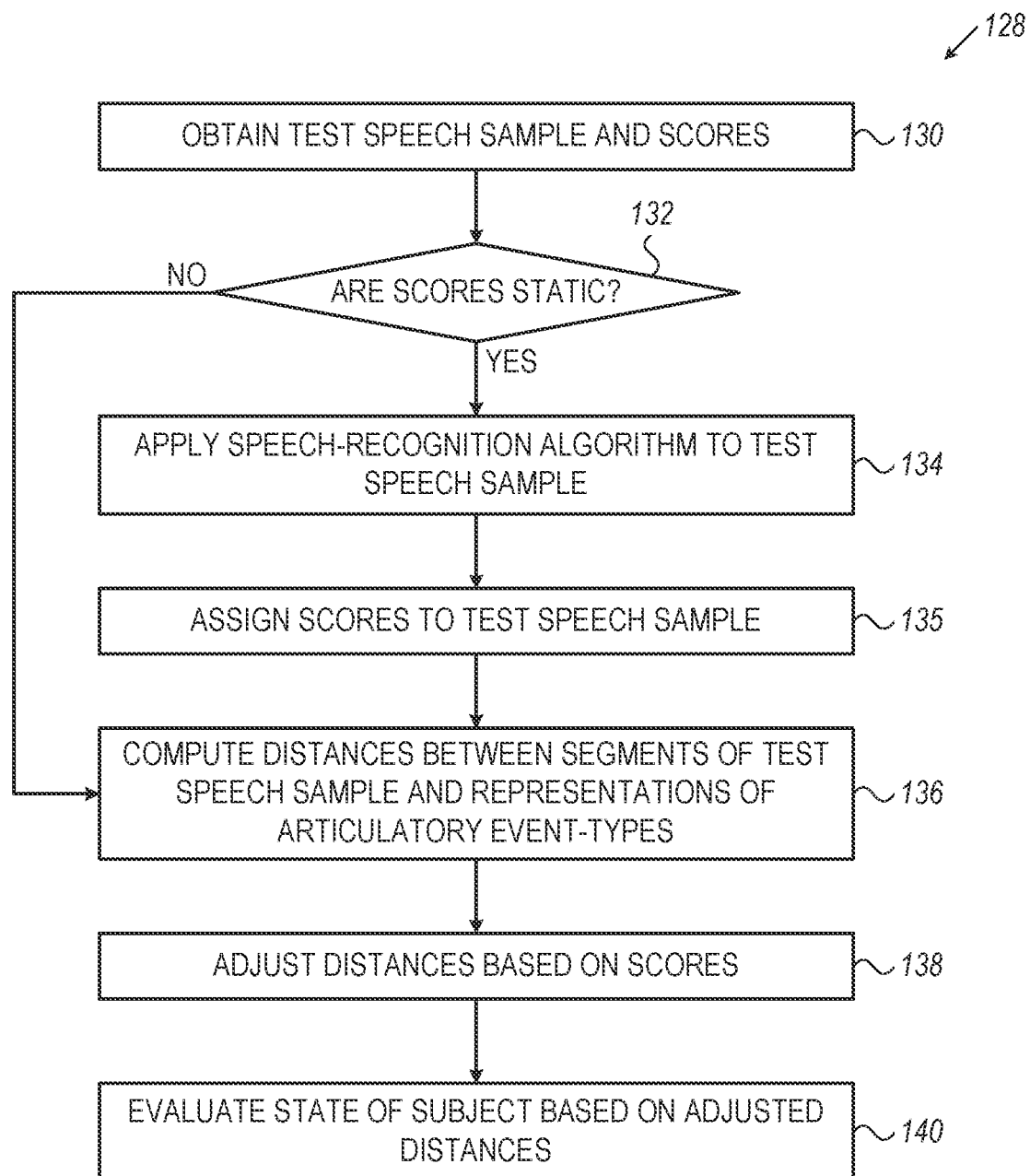
FIG. 9 is a flow diagram for an algorithm for using discrimination-effectiveness scores in evaluating the state of a subject, in accordance with some embodiments of the present invention.

Alternatively, for a discriminator that explicitly computes distances, each computed distance may be adjusted based on the relevant score. In this regard, reference is now made to FIG. 9, which is a flow diagram for an algorithm 128 for using discrimination-effectiveness scores in evaluating the state of a subject, in accordance with some embodiments of the present invention.

Algorithm 128 begins at an obtaining step 130, at which the processor obtains a test speech sample along with one or more discrimination-effectiveness scores. Subsequently to obtaining the sample and the scores, the processor checks, at a checking step 132, whether the scores are static. If yes, the processor, at a speech-recognition step 134, applies a speech-recognition algorithm to the test speech sample, thus identifying instances of various articulatory event-types represented in the sample. Subsequently, the processor, at a score-assigning step 135, assigns scores to the test speech sample; in particular, for each articulatory event-type of interest represented in the sample, each instance of the articulatory event-type is assigned the static score of the articulatory event-type.

Subsequently to performing score-assigning step 135, or if the scores are dynamic (in which case the scores are already assigned to the speech sample), the processor uses a discriminator to evaluate the state of the subject based on the scores.

In particular, at a distance-computing step 136, the processor computes the distance between each instance of an articulatory event-type (i.e., between the segment of the test speech sample representing this instance) and at least one representation of the articulatory event-type, such as a speech model or reference speech sample. Subsequently, at a distance-adjusting step 138, the processor adjusts the distances based on the scores. For example, the processor may compute each adjusted distance as $\phi(d,z)$, where d is the distance, z is the score, and $\phi$ is a function that is wide-sense monotonic in both d and z. For example, $\phi(d,z)$ may equal $d*z$.

Finally, at an evaluating step 140, the processor evaluates the state of the subject based on the adjusted distances. For example, the processor may sum the adjusted distances, and evaluate the state of the subject in response to comparing the sum to a predefined threshold.

For example, it will be assumed that the processor, at distance-computing step 136, computes the distance between the articulatory event-type and a model representing the articulatory event-type as produced in the first state. If the sum of adjusted distances is less than the threshold, the processor may output an indication that the subject is in the first state; otherwise, the processor may output an indication that the subject is in the second state.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
a memory configured to store program instructions; and
a processor, configured to:
load the program instructions from the memory, and by executing the program instructions:
obtain one or more representations of a type of sound produced by articulatory organs,
compute, based on the representations, a score quantifying an estimated degree to which an instance of the type of sound, when produced by someone having a disease, indicates a state, with respect to the disease, in which the instance was produced, and
store or communicate the score for subsequent use in evaluating the state of a subject with respect to the disease, based on a test utterance produced by the subject.

2. A method, comprising:
obtaining on one or more representations of a type of sound produced by articulatory organs;
computing, by a processor, based on the representations, a score quantifying an estimated degree to which an instance of the type of sound, when produced by someone having a disease, indicates a state, with respect to the disease, in which the instance was produced; and
storing or communicating the score for subsequent use in evaluating the state of a subject with respect to the disease, based on a test utterance produced by the subject.

3. The method according to claim 2, wherein the type of sound includes one or more phonemes.

4. The method according to claim 2, wherein the score quantifies the estimated degree to which any instance of the type of sound indicates the state.

5. The method according to claim 4, wherein the representations are respective segments of one or more speech samples.

6. The method according to claim 5,
wherein the speech samples are first-state speech samples produced while in a first state with respect to the disease, and the segments are first-state segments, and
wherein computing the score comprises computing the score based on:
one or more same-state distances quantifying a same-state similarity of the first-state segments to each other, and
one or more cross-state distances quantifying a cross-state similarity of the first-state segments to one or more second-state segments of at least one second-state speech sample produced while in a second state with respect to the disease.

7. The method according to claim 6, wherein computing the score based on the same-state distances and cross-state distances comprises:
computing respective counts for multiple segments, each of which is one of the first-state segments or one of the second-state segments, by, for each of the segments:
identifying, from a set S of distances including those of the same-state distances associated with the segment and those of the cross-state distances associated with the segment, a subset S', which includes, for a positive integer q, q smallest ones of the distances, and
computing the count for the segment as (i) a number v of the distances in S' that are same-state distances, or (ii) q−v; and
computing the score based on the counts.

8. The method according to claim 6, wherein computing the score based on the same-state distances and cross-state distances comprises computing the score by comparing a same-state statistic of the same-state distances to a cross-state statistic of the cross-state distances.

9. The method according to claim 5,
wherein the speech samples are first-state speech samples produced while in a first state with respect to the disease, and the segments are first-state segments, and
wherein computing the score comprises computing the score based on (i) multiple same-state distances between respective ones of the first-state segments and a first-state model representing the type of sound as produced while in the first state, and (ii) multiple cross-state distances between respective ones of the first-state segments and a second-state model representing the type of sound as produced while in the second state.

10. The method according to claim 5, wherein computing the score comprises:
obtaining respective outputs for the segments from a discriminator, each of the outputs estimating, for a different respective one of the segments, the state in which the segment was produced; and
computing the score based on a measure of accuracy of the outputs.

11. The method according to claim 5, wherein computing the score comprises computing the score based on respective neuronal outputs produced by a neural-network discriminator in response to evaluating, based on each of the segments, the state in which the segment was produced.

12. The method according to claim 11, wherein computing the score based on the neuronal outputs comprises:
computing respective score-components for the segments, each of the score-components having (i) a magnitude that is an increasing function of the neuronal output produced by the neural-network discriminator in response to the segment to which the score-component belongs, and (ii) a sign that depends on whether the evaluation, based on the segment to which the score-component belongs, is correct; and
computing the score based on the score-components.

13. The method according to claim 4, wherein the representations include a first-state model representing the type of sound as produced while in a first state with respect to the disease.

14. The method according to claim 13, wherein computing the score comprises computing the score based on a distance between the first-state model and a second-state model representing the type of sound as produced while in a second state with respect to the disease.

15. The method according to claim 14,
wherein the first-state model and second-state model represent the type of sound as produced by one or more other subjects,
wherein the distance is a first distance, and
wherein computing the score comprises computing the score based on a second distance between:
a subject-specific model representing the type of sound as produced by the subject while in the first state, and
the first-state model or the second-state model.

16. The method according to claim 13, wherein the first-state model represents the type of sound as produced by the subject, and wherein computing the score comprises computing the score based on:
  a same-state distance quantifying a same-state similarity of the first-state model to another first-state model representing the type of sound as produced by one or more other subjects while in the first state, and
  a cross-state distance quantifying a cross-state similarity of the first-state model to a second-state model representing the type of sound as produced by one or more other subjects while in the second state.

17. The method according to claim 4,
  wherein the type of sound is a target-language type of sound in a target language,
  wherein the score is a target-language score, and
  wherein computing the target-language score comprises:
    inputting one or more instances of the target-language type of sound to a tool configured to facilitate computing a source-language score for any instance of a source-language type of sound in a source language different from the target language, the source-language score quantifying another estimated degree to which the instance of the source-language type of sound indicates the state, with respect to the disease, in which the instance of the source-language type of sound was produced, and
    computing the target-language score based on computations performed by the tool in response to the inputting.

18. The method according to claim 17,
  wherein the tool includes a neural network trained to predict an accuracy with which a discriminator would estimate the state based on the instance of the source-language type of sound, and
  wherein computing the target-language score comprises computing the target-language score based on respective predicted accuracies output by the neural network in response to the instances of the target-language type of sound.

19. The method according to claim 17,
  wherein the test utterance is a target-language test utterance in the target language,
  wherein the tool includes a neural-network discriminator configured to process a source-language test utterance in the source language so as to evaluate the state in which the source-language test utterance was produced, and
  wherein computing the target-language score comprises computing the target-language score based on neuronal outputs produced by the neural-network discriminator in response to processing the instances of the target-language type of sound.

20. The method according to claim 2, wherein the representations include a segment of a speech sample representing the instance, which speech sample was produced by the subject.

21. The method according to claim 20, further comprising:
  obtaining respective outputs, from a discriminator, for multiple training instances of the type of sound, each of the outputs estimating the state in which a different respective one of the training instances was produced; and
  using the training instances, the outputs, and respective actual states in which the training instances were produced, training a neural network to predict an accuracy of the discriminator for any instance of the type of sound,
  wherein computing the score comprises computing the score based on the accuracy predicted for the segment by the neural network.

22. The method according to claim 20, wherein computing the score comprises computing the score based on a neuronal output produced by a neural-network discriminator in response to processing the segment.

23. A computer software product comprising a tangible non-transitory computer-readable medium in which program instructions are stored, which instructions, when read by a processor, cause the processor to:
  obtain one or more representations of a type of sound produced by articulatory organs,
  compute, based on the representations, a score quantifying an estimated degree to which an instance of the type of sound, when produced by someone having a disease, indicates a state, with respect to the disease, in which the instance was produced, and
  store or communicate the score for subsequent use in evaluating the state of a subject with respect to the disease, based on a test utterance produced by the subject.

24. The computer software product according to claim 23, wherein the type of sound includes one or more phonemes.

25. The computer software product according to claim 23, wherein the score quantifies the estimated degree to which any instance of the type of sound indicates the state.

26. The computer software product according to claim 25, wherein the representations are respective segments of one or more speech samples.

27. The computer software product according to claim 26,
  wherein the speech samples are first-state speech samples produced while in a first state with respect to the disease, and the segments are first-state segments, and
  wherein the instructions cause the processor to compute the score based on:
    one or more same-state distances quantifying a same-state similarity of the first-state segments to each other, and
    one or more cross-state distances quantifying a cross-state similarity of the first-state segments to one or more second-state segments of at least one second-state speech sample produced while in a second state with respect to the disease.

28. The computer software product according to claim 27, wherein the instructions cause the processor to compute the score based on the same-state distances and cross-state distances by:
  computing respective counts for multiple segments, each of which is one of the first-state segments or one of the second-state segments, by, for each of the segments:
    identifying, from a set S of distances including those of the same-state distances associated with the segment and those of the cross-state distances associated with the segment, a subset S', which includes, for a positive integer q, q smallest ones of the distances, and
    computing the count for the segment as (i) a number v of the distances in S' that are same-state distances, or (ii) q−v, and
  computing the score based on the counts.

29. The computer software product according to claim 27, wherein the instructions cause the processor to compute the score based on the same-state distances and cross-state distances by comparing a same-state statistic of the same-state distances to a cross-state statistic of the cross-state distances.

30. The computer software product according to claim 26, wherein the speech samples are first-state speech samples produced while in a first state with respect to the disease, and the segments are first-state segments, and wherein the instructions cause the processor to compute the score based on (i) multiple same-state distances between respective ones of the first-state segments and a first-state model representing the type of sound as produced while in the first state, and (ii) multiple cross-state distances between respective ones of the first-state segments and a second-state model representing the type of sound as produced while in the second state.

31. The computer software product according to claim 26, wherein the instructions cause the processor to compute the score by:

obtaining respective outputs for the segments from a discriminator, each of the outputs estimating, for a different respective one of the segments, the state in which the segment was produced, and computing the score based on a measure of accuracy of the outputs.

32. The computer software product according to claim 26, wherein the instructions cause the processor to compute the score based on respective neuronal outputs produced by a neural-network discriminator in response to evaluating, based on each of the segments, the state in which the segment was produced.

33. The computer software product according to claim 32, wherein the instructions cause the processor to compute the score based on the neuronal outputs by:

computing respective score-components for the segments, each of the score-components having (i) a magnitude that is an increasing function of the neuronal output produced by the neural-network discriminator in response to the segment to which the score-component belongs, and (ii) a sign that depends on whether the evaluation, based on the segment to which the score-component belongs, is correct, and computing the score based on the score-components.

34. The computer software product according to claim 25, wherein the representations include a first-state model representing the type of sound as produced while in a first state with respect to the disease.

35. The computer software product according to claim 34, wherein the instructions cause the processor to compute the score based on a distance between the first-state model and a second-state model representing the type of sound as produced while in a second state with respect to the disease.

36. The computer software product according to claim 35, wherein the first-state model and second-state model represent the type of sound as produced by one or more other subjects, wherein the distance is a first distance, and wherein the instructions cause the processor to compute the score based on a second distance between:

a subject-specific model representing the type of sound as produced by the subject while in the first state, and the first-state model or the second-state model.

37. The computer software product according to claim 34, wherein the first-state model represents the type of sound as produced by the subject, and wherein the instructions cause the processor to compute the score based on:

a same-state distance quantifying a same-state similarity of the first-state model to another first-state model representing the type of sound as produced by one or more other subjects while in the first state, and a cross-state distance quantifying a cross-state similarity of the first-state model to a second-state model representing the type of sound as produced by one or more other subjects while in the second state.

38. The computer software product according to claim 25, wherein the type of sound is a target-language type of sound in a target language, wherein the score is a target-language score, and wherein the instructions cause the processor to compute the target-language score by:

inputting one or more instances of the target-language type of sound to a tool configured to facilitate computing a source-language score for any instance of a source-language type of sound in a source language different from the target language, the source-language score quantifying another estimated degree to which the instance of the source-language type of sound indicates the state, with respect to the disease, in which the instance of the source-language type of sound was produced, and computing the target-language score based on computations performed by the tool in response to the inputting.

39. The computer software product according to claim 38, wherein the tool includes a neural network trained to predict an accuracy with which a discriminator would estimate the state based on the instance of the source-language type of sound, and wherein the instructions cause the processor to compute the target-language score based on respective predicted accuracies output by the neural network in response to the instances of the target-language type of sound.

40. The computer software product according to claim 38, wherein the test utterance is a target-language test utterance, wherein the tool includes a neural-network discriminator configured to process a source-language test utterance in the source language so as to evaluate the state in which the source-language test utterance was produced, and wherein the instructions cause the processor to compute the target-language score based on neuronal outputs produced by the neural-network discriminator in response to processing the instances of the target-language type of sound.

41. The computer software product according to claim 23, wherein the representations include a segment of a speech sample representing the instance, which speech sample was produced by the subject.

42. The computer software product according to claim 41, wherein the instructions further cause the processor to:

obtain respective outputs, from a discriminator, for multiple training instances of the type of sound, each of the outputs estimating the state in which a different respective one of the training instances was produced, and using the training instances, the outputs, and respective actual states in which the training instances were produced, train a neural network to predict an accuracy of the discriminator for any instance of the type of sound, and wherein the instructions cause the processor to compute the score based on the accuracy predicted for the segment by the neural network.

43. The computer software product according to claim 41, wherein the instructions cause the processor to compute the score based on a neuronal output produced by a neural-network discriminator in response to processing the segment.

\* \* \* \* \*